(12) United States Patent
Yamamoto et al.

(10) Patent No.: US 6,637,192 B2
(45) Date of Patent: Oct. 28, 2003

(54) CYLINDER INJECTION TYPE INTERNAL COMBUSTION ENGINE

(75) Inventors: Shigeo Yamamoto, Obu (JP); Kazuyoshi Nakane, Okazaki (JP); Hiroaki Miyamoto, Okazaki (JP); Dai Tanaka, Okazaki (JP); Jun Takemura, Toyota (JP); Hiromitsu Ando, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/107,492

(22) Filed: Mar. 28, 2002

(65) Prior Publication Data

US 2002/0129600 A1 Sep. 19, 2002

Related U.S. Application Data

(62) Division of application No. 09/506,337, filed on Feb. 18, 2000, now Pat. No. 6,438,943.

(30) Foreign Application Priority Data

Feb. 19, 2000 (JP) .......................................... 11-042144

(51) Int. Cl.$^7$ ............................. F01N 9/00; F02D 41/40
(52) U.S. Cl. ............................. 60/274; 60/284; 60/285; 123/295

(58) Field of Search ............................... 123/295, 299, 123/300; 60/274, 284, 285

(56) References Cited

U.S. PATENT DOCUMENTS

| 5,967,113 | A | | 10/1999 | Kaneko et al. ............. 123/295 |
| 5,988,136 | A | | 11/1999 | Piock et al. ................. 123/295 |
| 6,044,642 | A | | 4/2000 | Nishimura et al. ........... 60/285 |
| 6,112,716 | A | * | 9/2000 | Tachibana ................... 123/305 |

FOREIGN PATENT DOCUMENTS

| JP | 8100633 A | 4/1996 |
| JP | 10-047040 | 2/1998 |

* cited by examiner

*Primary Examiner*—Andrew M. Dolinar
(74) *Attorney, Agent, or Firm*—Birch, Stewart, Kolasch & Birch, LLP

(57) ABSTRACT

When an increase in a temperature of an exhaust-gas purifying catalyst device in an in-cylinder injection type internal combustion engine is demanded, a temperature-increase control section in an electronic control unit accomplishes stratified combustion by causing each fuel injection valve to inject fuel directly into the associated combustion chamber in a compression stroke in such a way that the air-fuel ratio of the internal combustion engine is in a vicinity of a stoichiometric air-fuel ratio. This allows the temperature of the exhaust-gas purifying catalyst device to be maintained or increased without increasing fuel consumption.

16 Claims, 16 Drawing Sheets

CYLINDER INJECTION TYPE INTERNAL COMBUSTION ENGINE

This application is a divisional of application Ser. No. 09/506,337, filed on Feb. 18, 2000, now U.S. Pat. No. 6,438,943 B1 the entire contents of which are hereby incorporated by reference and for which priority is claimed under 35 U.S.C. §120; and this application claims priority of Application No. 11-042144 filed in Japan on Feb. 19, 1999 under 35 U.S.C. §119.

FIELD OF THE INVENTION

The present invention relates to an in-cylinder injection type internal combustion engine, and more specifically, to a catalyst-temperature raising technique utilized in an in-cylinder injection type internal combustion engine.

BACKGROUND OF THE INVENTION

Recently, in-cylinder injection type internal combustion engines, which inject fuel directly into a combustion chamber, have been put to a practical use. This type of an internal combustion engine generally undergoes such control as to switch between a stratified combustion and uniform combustion in accordance with operating conditions of the engine.

This type of internal combustion engine is also provided with an exhaust-gas purifying catalyst device in its exhaust passage to suppress harmful components or emissions in the exhaust gas emitted in the atmosphere. The temperature of this catalyst device should be raised to or above a predetermined temperature in order to acquire a sufficient exhaust-gas purifying characteristic. In the field of the aforementioned internal combustion engines, there have been developed a scheme of activating the catalyst device faster and a scheme of preventing the temperature of the catalyst device from falling below the predetermined temperature.

The technique disclosed in Japanese Unexamined Patent Publication (KOKAI) No. Hei 8-100633, for example, carries out a sub-injection in the first half of the power stroke or expansion stroke after executing a main injection for obtaining the output power and reburns the fuel in the sub-injection by utilizing the flame propagation of the main combustion from the main injection. This technique raises the temperature of the exhaust gas earlier to thereby quickly activate the catalyst device after cold starting.

There may be a case where a stratified combustion operation (e.g., an idling operation), in which the temperature of the exhaust gas becomes lower than that in a uniform combustion operation, continues after warm-up, thereby causing the temperature of the catalyst device to fall. In such a case, the technique disclosed in Japanese Unexamined Patent Publication (KOKAI) No. Hei 10-47040 keeps the catalyst temperature at or above a predetermined activation temperature by switching the operation of the in-cylinder injection type internal combustion engine to the uniform combustion operation from the stratified combustion operation. This prevents deterioration of the exhaust-gas purifying characteristic.

Because the former technique needs to inject a large amount of extra fuel, which does not contribute to the output of the engine, in order to increase the catalyst temperature, the fuel consumption gets higher. Since the amount of the temperature of the exhaust gas to be raised is not large in the latter technique, the time for the uniform premix combustion operation to keep or recover the temperature of the catalyst device becomes longer. This results in higher fuel consumption.

SUMMARY OF THE INVENTION

Accordingly, it is an object of the present invention to provide an in-cylinder injection type internal combustion engine which can improve the exhaust-gas purifying characteristic while suppressing an increase in fuel consumption.

To achieve this object, according to one aspect of this invention, an in-cylinder injection type internal combustion engine having fuel injection valves for injecting directly into combustion chambers of the internal combustion engine comprises, an exhaust-gas purifying catalyst device, provided in an exhaust passage of the internal combustion engine, for purifying harmful components in an exhaust gas; and a control device having a temperature-increase control section for achieving a stratified combustion in such a way that an air-fuel ratio of the internal combustion engine becomes a stoichiometric air-fuel ratio or in a vicinity thereof when an increase in a temperature of the exhaust-gas purifying catalyst device is needed.

As this structure achieves a stratified combustion in such a way that the air-fuel ratio of the engine becomes a stoichiometric air-fuel ratio or in a vicinity thereof, it is possible to feed plenty of carbon monoxide (CO) and oxygen ($O_2$) into the exhaust-gas purifying catalyst device at the same time to cause an oxidation reaction without impairing the fuel consumption. This can allow the temperature of the exhaust-gas purifying catalyst device to be increased efficiently by reaction heat.

In this case, it is preferable that the control device performs open-loop control in such a manner that the air-fuel ratio becomes approximately 14 to 16.

The in-cylinder injection type internal combustion engine preferably further comprises an oxygen-concentration detecting device, provided in the exhaust passage, for detecting an oxygen concentration in the exhaust gas, whereby the control device performs a feedback control based on an output of the oxygen-concentration detecting device in such a way that the air-fuel ratio becomes the stoichiometric air-fuel ratio.

This can enhance reliability of the control and can improve the efficiency of raising the temperature of the exhaust-gas purifying catalyst device.

It is preferable that the in-cylinder injection type internal combustion engine further comprises ignition plugs provided on an engine body in such a way as to face the combustion chambers, and the control device further includes an injection-timing control section for controlling injection timings of the fuel injection valves and ignition-timing control section for controlling ignition timings of the ignition plugs, whereby at a time the temperature-increase control section is activated, the control device adjusts either each of the injection timings set by the injection-timing control section or each of the ignition timings set by the ignition-timing control section in such a way as to make an interval between those injection timing and ignition timing longer than that in stratified combustion in which the temperature-increase control section is not activated.

This structure can efficiently raise the temperature of the exhaust-gas purifying catalyst device while suppressing generation of smoke.

In the in-cylinder injection type internal combustion engine, it is preferable that the control device further includes an additional-fuel injection control section for injecting fuel in an injection other than a main injection for main combustion, whereby before activation of the temperature-increase control section, the control device causes the additional-fuel injection control section to inject additional fuel in an expansion stroke after the main injection.

This structure can improve the efficiency of raising the temperature of the exhaust-gas purifying catalyst device, particularly, at the time of cold starting.

DETAILED DESCRIPTION OF THE PREFERRED EMBODIMENTS

Preferred embodiments of the present invention will now be described with reference to the accompanying drawings.

Figure 1:
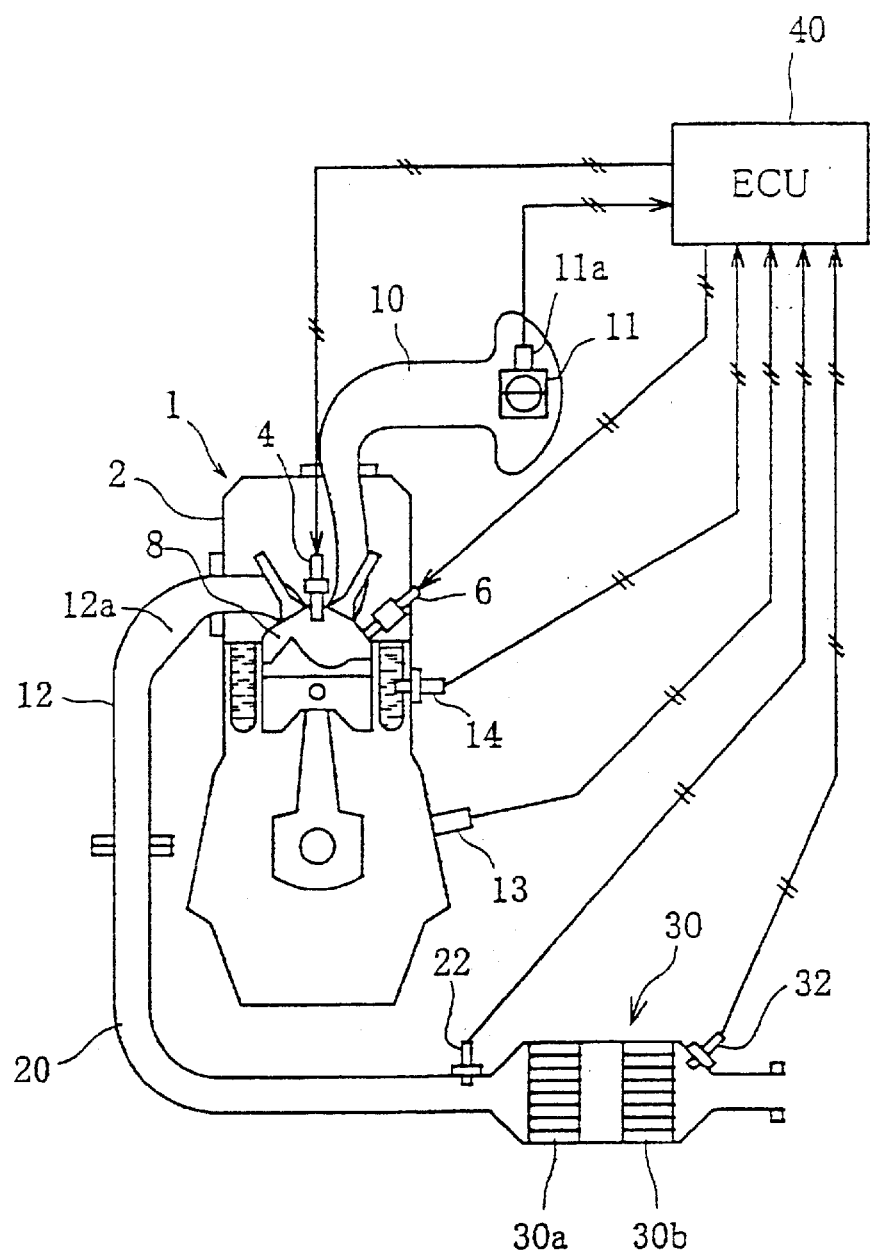
FIG. 1 is a schematic structural diagram illustrating an in-cylinder injection type internal combustion engine according to this invention.

FIG. 1 presents a schematic structural diagram of an in-cylinder injection type internal combustion engine according to the preferred embodiments of this invention which is to be installed in a vehicle. The structure of the in-cylinder injection type internal combustion engine will be discussed below by referring to this figure.

An engine body 1 (hereinafter simply called an "engine") is, for example, an inline 4-cylinder gasoline engine which switches between two fuel injection modes (operation modes) in accordance with operational or running conditions of the engine. The first mode is an intake stroke injection mode in which fuel is injected during an intake stroke to accomplish a uniform combustion. The second mode is a compression stroke injection mode in which fuel is injected during a compression stroke to accomplish a stratified combustion.

This engine 1 can operate at a stoichiometric air-fuel ratio (stoichiometric air-fuel ratio operation), at a rich air-fuel ratio (rich operation), and at a lean air-fuel ratio (e.g., an air-fuel ratio of about 18 to 23) (lean operation) in the intake stroke injection mode, and can also operate at an overlean air-fuel ratio (e.g., an air-fuel ratio of about 25 to 50) (overlean operation) in the compression stroke injection mode.

Further, this engine 1 performs fuel injection during the expansion stroke as well as during the intake stroke or compression stroke. Specifically, the engine 1 can carry out fuel injection in two stages or two-stage injection of performing main injection for main combustion in the intake stroke or compression stroke and then injecting additional fuel in the expansion stroke. This two-stage injection aims at increasing the temperature of the exhaust gas by causing the fuel, mainly injected in the sub-injection during the expansion stroke, not to contribute to an engine output but allowing it to react (be burned) with excess oxygen through the second half of the expansion stroke and the exhaust stroke.

As shown in FIG. 1, an ignition plug 4 and an electromagnetic type fuel injection valve 6 are provided in a cylinder head 2 of the engine 1 for each cylinder. Those fuel injection valves 6 are provided in such a way as to inject fuel directly into associated combustion chambers 8.

The fuel injection valves 6 are connected to an unillustrated fuel supply device. The fuel supply device is provided with a low-pressure fuel pump, which pumps fuel from a fuel tank and supplies the fuel to a high-pressure fuel pump, which pressurizes the fuel from the low-pressure fuel pump. This structure permits each fuel injection valve 6 to inject fuel at a desired fuel pressure. At this time, the total amount of fuel injection is determined based on the fuel pumping pressure of the high-pressure fuel pump and the valve open time of the fuel injection valve 6 or the fuel injection time.

Intake passages are formed, cylinder by cylinder, in the cylinder head 2, approximately in a vertical direction. One end of an intake manifold 10 is connected to the cylinder head 2 in such a way as to communicate with the intake passages. A throttle valve 11 is connected to the other end of the intake manifold 10, and is provided with a throttle sensor 11a which detects a throttle-valve angle θth.

Exhaust passages are formed, cylinder by cylinder, in the cylinder head 2, approximately in a horizontal direction. One end of an exhaust manifold 12 is connected to the cylinder head 2 in such a way as to communicate with the exhaust passages.

A crank-angle sensor 13 detects a crank angle CA. An engine speed Ne is detected on the basis of the output signal (crank angle CA) of this crank-angle sensor 13. A coolant-temperature sensor 14 detects the coolant temperature WT of the engine 1. Based on the temperature information from the coolant-temperature sensor 14, it is possible to determine whether the engine 1 is in a cold state or warmed-up state.

As the in-cylinder injection type internal combustion engine 1, according to this embodiment, is of a known type, the details of its structure will not be discussed here.

The exhaust manifold 12 is of a reaction type that can efficiently burn unburned fuel components (flammable substances such as unburned HC), which are discharged from the individual cylinders, in the exhaust passage. This reaction type exhaust manifold 12 has an exhaust junction 12a where exhaust gases from the individual cylinders are gathered. As apparent from FIG. 1, the volume of the exhaust junction 12a is greater than that of an ordinary exhaust manifold. That is, the volume of the exhaust junction 12a is so designed that the unburned fuel components, which stagnate at the exhaust junction 12a, are mixed and reacted (burned) with excess oxygen. This permits, particularly, the unburned fuel components (essentially HC), discharged from the individual cylinders in the sub-injection in the two-stage injection, to be sufficiently burned, thus efficiently raising the exhaust-gas temperature.

As illustrated in this figure, the exhaust manifold 12 is connected to an exhaust pipe 20, to which a muffler (not shown) is connected via an exhaust-gas purifying catalyst device 30. The exhaust pipe 20 is provided with an $O_2$ sensor 22 which detects the oxygen concentration in the exhaust gas. This $O_2$ sensor 22 has such a characteristic that the output voltage significantly changes with the stoichiometric air-fuel ratio taken as a reference. Specifically, the output voltage becomes larger on the rich air-fuel ratio side but becomes smaller on the lean air-fuel ratio side (in the vicinity of the value "0"). The air-fuel ratio of the engine 1 can therefore be set to approximately the stoichiometric air-fuel ratio by oscillating the air-fuel ratio between the lean air-fuel ratio and rich air-fuel ratio. This is called stoichiometric feedback control or $O_2$ feedback control, and will be hereinafter referred to as "$O_2$-F/B control." As the $O_2$ sensor is of a known type, its detailed structure will not be discussed here.

The exhaust-gas purifying catalyst device 30 has a selective reduction type NOx catalyst 30a, which can selectively purify NOx in the exhaust gas containing HC in the lean air-fuel ratio operation, and a three-way catalyst 30b. The three-way catalyst 30b is located downstream of and adjacent to the selective reduction type NOx catalyst 30a. The selective reduction type NOx catalyst 30a, which has almost the same structure as the three-way catalyst 30b but carries a different substance, can selectively purify a large amount of NOx in the exhaust gas even under an oxidized atmosphere.

Provided at the downstream of the three-way catalyst 30b is an exhaust-temperature sensor 32, which can detect the temperature of the exhaust gas that has passed the exhaust-gas purifying catalyst device 30 (exhaust temperature Tex). The exhaust temperature Tex, detected by this exhaust-temperature sensor 32, can be considered as the substantial temperature of the exhaust-gas purifying catalyst device 30. Based on the output signal of the exhaust-temperature sensor 32, therefore, it is possible to determine whether or not the exhaust-gas purifying characteristic of the exhaust-gas purifying catalyst device 30 can be acquired sufficiently, i.e., whether or not the temperature of this catalyst device 30 has reached such a level at which the selective reduction type NOx catalyst 30a and the three-way catalyst 30b can function sufficiently.

An electronic control unit (ECU) 40 has an input/output device, a storage unit (ROM, RAM, non-volatile RAM or the like), a central processing unit (CPU), and a timer counter. This ECU 40 is a control device which executes the general control of the in-cylinder injection type internal combustion engine according to this embodiment. Connected to the input side of the ECU 40 are various sensors, such as the throttle sensor 11 a, crank-angle sensor 13, coolant-temperature sensor 14, $O_2$ sensor 22, and exhaust-temperature sensor 32, whose detection information are input to the ECU 40.

The aforementioned ignition plugs 4 and fuel injection valves 6 are connected, via ignition coils, to the output side of the ECU 40. The ECU 40 has an injection-timing control section and a fuel control section, and outputs optimal values for the ignition timing, the amount of fuel injection, and the fuel injection timing to each ignition plug 4 and fuel injection valve 6 based on the output signals from the various sensors. Accordingly, the proper amount of fuel is injected from each fuel injection valve 6 at an adequate timing and is ignited at an optimal timing by the associated ignition plug 4.

Specifically, based on the throttle-valve angle information θth from the throttle sensor 11a and the engine speed information Ne from the crank-angle sensor 13, the ECU 40 acquires a target average effective pressure Pe for the engine load. Based on information on the target average effective pressure Pe and the engine speed Ne, normally, the fuel injection mode or the operation mode is set with reference to a preset fuel injection mode map (not shown). When the target average effective pressure Pe and the engine speed Ne are both small, for example, the operation mode becomes the compression stroke injection mode or compression lean mode (compression L mode), in which fuel is injected from the fuel injection valve 6 during the compression stroke so that the target air-fuel ratio (target A/F) becomes an overlean air-fuel ratio (e.g., about 25 to 50). When the target average effective pressure Pe or the engine speed Ne becomes larger, the operation mode becomes the intake stroke injection mode, in which fuel is injected during the intake stroke. This intake stroke injection mode includes an intake lean mode which controls the target AIF to be a lean air-fuel ratio (e.g., about 18 to 23), an intake stroke $O_2$ feedback mode (intake $O_2$-F/B mode), which controls the actual air-fuel ratio of the engine (actual A/F) to be the stoichiometric air-fuel ratio, and an open loop mode (intake O/L mode) which controls the target A/F to be a rich air-fuel ratio.

The target A/F is set based on the target average effective pressure Pe and the engine speed Ne, and the amount of fuel to be injected from the fuel injection valve 6 is determined based on the target A/F.

The operation modes also include a two-stage injection mode which carries out a main injection during the intake stroke or compression stroke and then injects additional fuel during the expansion stroke. This two-stage injection mode is executed by an additional-fuel injection control section, provided in the ECU 40, in accordance with the running conditions of the engine 1 that are determined based on the detection information from the various sensors.

The in-cylinder injection type internal combustion engine of this embodiment further has a compression stroke slight lean mode (compression S/L mode) which controls the air-fuel ratio to a slight lean air-fuel ratio (e.g., about 14.7 to 16), slightly leaner than the stoichiometric air-fuel ratio, by injecting fuel during the compression stroke, and a compression stroke $O_2$ feedback mode (compression $O_2$-F/B mode) which performs feedback control to permit the actual A/F to become the stoichiometric air-fuel ratio, both based on the detection information from the various sensors when the temperature of the exhaust-gas purifying catalyst device 30 is low. Those operation modes are carried out by a temperature-increase control section provided in the ECU 40 to raise the temperature of the exhaust-gas purifying catalyst device 30.

A description will now be given with respect to the control to raise the temperature of the exhaust-gas purifying catalyst device 30 in the in-cylinder injection type internal combustion engine of this embodiment.

There are cases where the temperature of the exhaust-gas purifying catalyst device 30 becomes low. One of such cases is a stratified combustion operation (compression stroke injection mode) where a low-exhaust-temperature operation mode, in which the exhaust temperature Tex becomes low, continues over a long period of time, thereby lowering the temperature of the exhaust-gas purifying catalyst device 30. Another case is the cold starting mode where the engine 1 has been stopped for a long period of time, making the temperature of the exhaust-gas purifying catalyst device 30 lower than the activation temperature. Temperature raising controls for those cases will be discussed individually below.
First Embodiment The temperature raising control for the former case will be discussed first.

Figure 2:
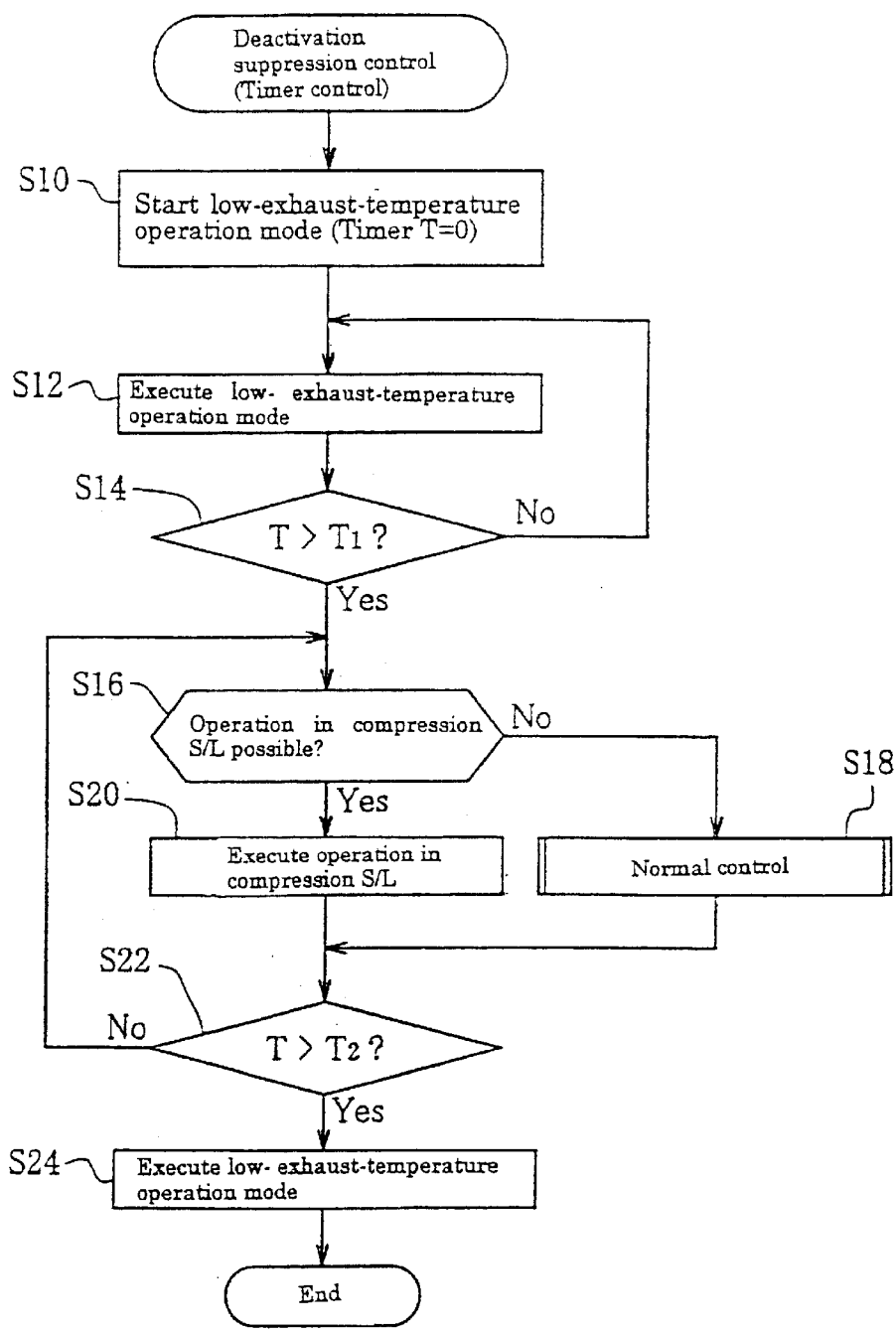
FIG. 2 is a flowchart illustrating a control routine for a deactivation suppression control (timer control) using a timer according to a first embodiment of this invention.
Figure 3:
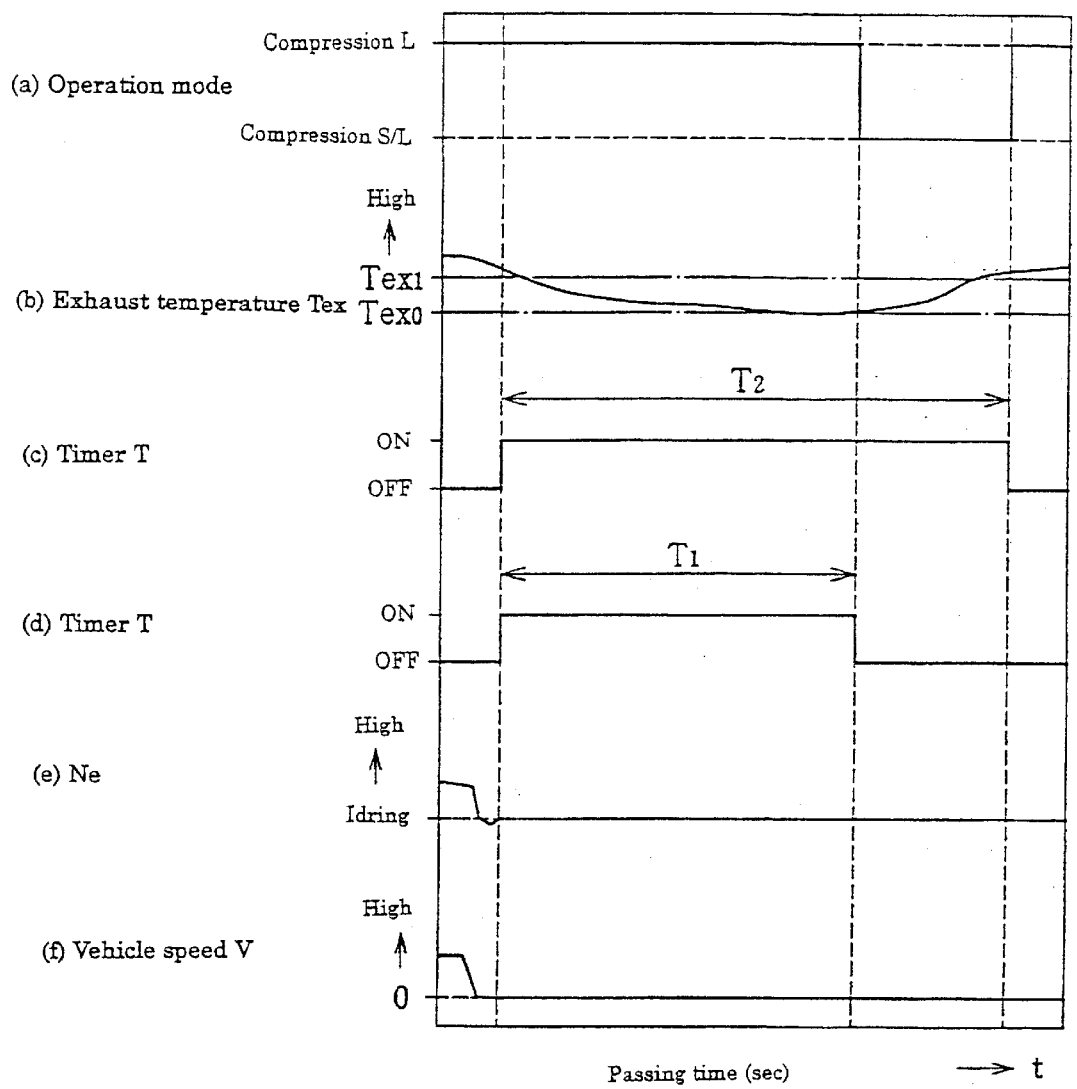
FIG. 3 is a time chart showing control contents of the deactivation suppression control in FIG. 2.

FIG. 2 is a flowchart illustrating a control routine for deactivation suppression control to prevent the temperature of the exhaust-gas purifying catalyst device 30 from falling below a predetermined temperature (e.g., the activation temperature), particularly, a control routine using a timer control. FIG. 3 presents a time chart of the deactivation suppression control. The first embodiment will now be explained referring to FIGS. 2 and 3.

First, in step S10, if it is determined, based on the aforementioned fuel injection mode map, that the operation mode is, for example, both the compression L mode and the idling mode where the engine speed Ne becomes low, i.e., the determined operation mode is the low-exhaust-temperature operation mode, a timer T used in this routine is reset to "0" and is made to start counting (see (a), (b), (c), and (d) in FIG. 3). Then, the low-exhaust-temperature operation mode is carried out in step S12.

In the next step S14, it is determined if the count of the timer T has reached a predetermined timer time T1, i.e., if an operation in the low-exhaust-temperature operation mode has continued over the predetermined timer time T1. The predetermined timer time T1 has previously been set based on experimental results or the like to such a length over which the temperature of the exhaust-gas purifying catalyst device 30 or the exhaust temperature Tex is assumed to have fallen to or below a predetermined value (deactivation temperature) $T_{ex0}$ when the operation in low-exhaust-temperature operation mode continues. When the decision result is negative (NO), the flow returns to step S12 to keep the operation in low-exhaust-temperature operation mode. When the decision result is affirmative (YES) or it is determined that the count of the timer T has exceeded the predetermined timer time T1 and the operation in low-exhaust-temperature operation mode has continued over the predetermined timer time T1 (see (d) in FIG. 3), on the other hand, the flow advances to step S16.

In step S16, it is determined whether or not an operation in the compression S/L mode can be performed before raising the temperature of the exhaust-gas purifying catalyst device 30. Specifically, it is determined if the engine speed Ne, the target average effective pressure Pe, and the vehicle speed V are equal to or smaller than respective predetermined values.

When any one of the engine speed Ne, the target average effective pressure Pe, and the vehicle speed V is higher than the associated predetermined value, the vehicle can be considered to be in the normal running conditions in which the exhaust temperature is high. In this case, the effect of increasing the temperature of the exhaust-gas purifying catalyst device 30 can be obtained sufficiently without using this control. Therefore, if the decision result in step S16 is "NO" because any one of the engine speed Ne, the target average effective pressure Pe, and the vehicle speed V is higher than the associated predetermined value, the flow advances to step S18.

In other words, when any one of the engine speed Ne, the target average effective pressure Pe, and the vehicle speed V is higher than the associated predetermined value, one can assume that the driver is demanding the engine 1 of high power and wants to actively run the engine 1. In such a case, the operation in the compression S/L mode will not be performed because executing the compression S/L mode is likely to increase excessively the temperature of the exhaust-gas purifying catalyst device 30.

In this case, therefore, the normal control is carried out in step S18 without performing the operation in the compression S/L mode, i.e., without executing the control to raise the temperature of the exhaust-gas purifying catalyst device 30. That is, the engine 1 is run based on the aforementioned fuel injection mode map.

If the decision result in step S16 is "YES," which means that all of the engine speed Ne, the target average effective pressure Pe, and the vehicle speed V are equal to or lower than the respective predetermined values, the flow goes to step S20 to carry out the operation in compression S/L mode.

In this compression S/L mode, as mentioned above, fuel injection is carried out in the compression stroke with the air-fuel ratio so controlled as to be a slight lean air-fuel ratio (e.g., about 14.7 to 16) slightly leaner than the stoichiometric air-fuel ratio (14.7) (temperature-increase control section).

This control locally creates a rich air-fuel ratio state with a high fuel concentration in the target cylinder so that oxygen locally becomes insufficient. This brings about incomplete fuel combustion, producing a relatively large amount of carbon monoxide (CO). The insufficient oxygen causes hydrogen ($H_2$) generated by the combustion to remain.

As the combustion in the compression stroke injection mode is a stratified combustion, a large amount of oxygen ($O_2$) that do not contribute to combustion remain as excess oxygen at those portions in the combustion chamber 8 which are remote from the locally-rich air-fuel ratio areas.

In other words, when the operation mode is the compression S/L mode, relatively large amounts of carbon monoxide (CO) and hydrogen ($H_2$) are produced and are discharged into the exhaust manifold 12, and, at the same time, the excess oxygen ($O_2$) that do not contribute to combustion is discharged into the exhaust manifold 12.

Figure 4:
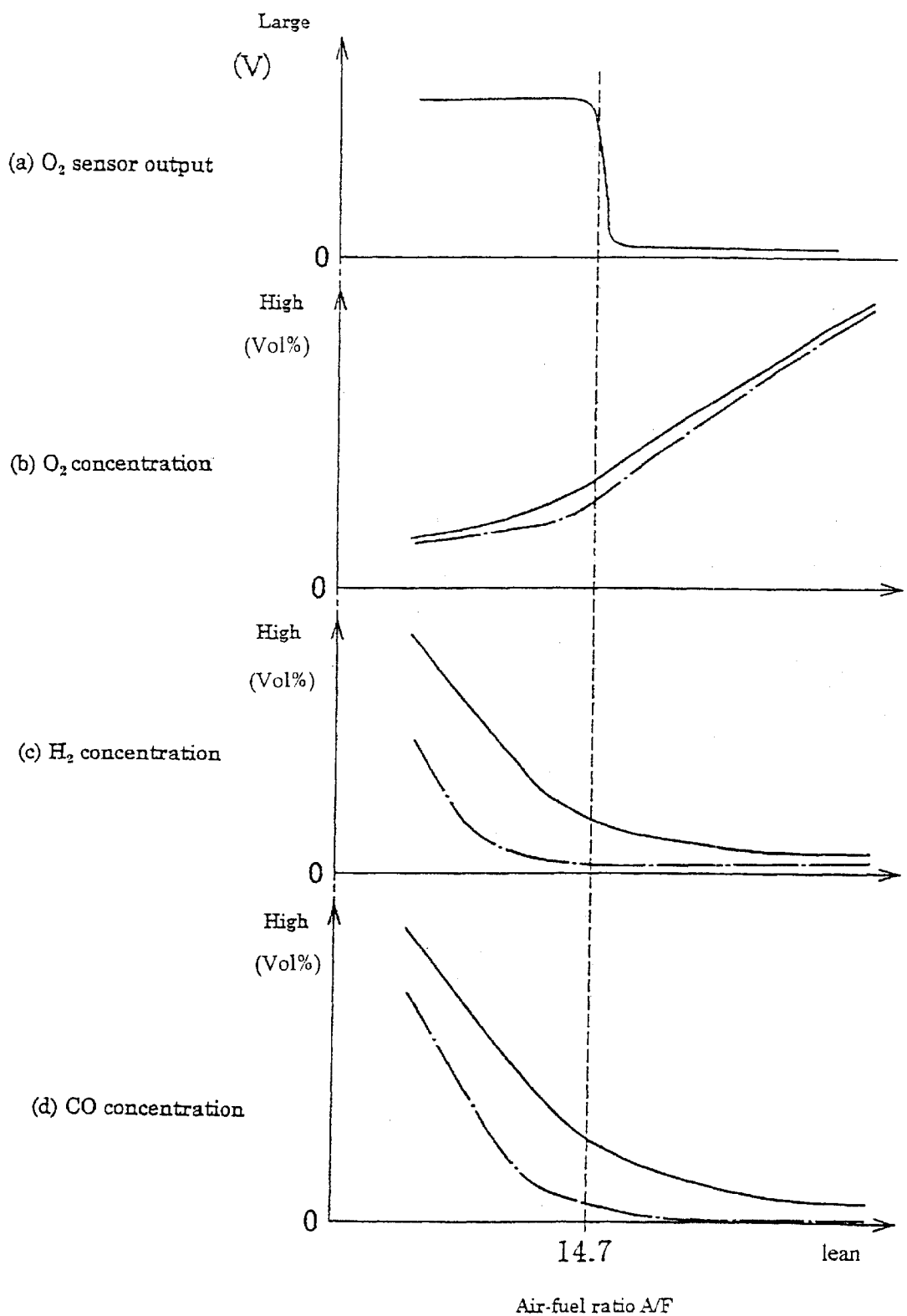
FIG. 4 is a diagram showing an $O_2$ sensor output (a), an $O_2$ concentration (b), $H_2$ concentration (c), and CO concentration (d) in comparison with one another in a case (solid lines) where compression stroke injection is performed and in a case (one-dot chain lines) where the conventional uniform premix combustion operation is performed, as the air-fuel ratio A/F is changed in both cases.

In FIG. 4, the solid lines show the output of the $O_2$ sensor (a), $O_2$ concentration (b), $H_2$ concentration (c), and CO concentration (d) in the case where the compression stroke injection is performed while changing the air-fuel ratio A/F in comparison with similar results indicated by one-dot chain lines in the case where the intake stroke injection is performed while changing the air-fuel ratio A/F. As apparent from this diagram, when the intake stroke injection is performed with the air-fuel ratio set in a vicinity of the stoichiometric air-fuel ratio (one-dot chain lines), uniform premix combustion occurs, so that the $H_2$ concentration is set to approximately 0 vol % and the CO concentration is set to approximately 0.5 vol %. When the compression stroke injection is performed with the air-fuel ratio set in a vicinity of the stoichiometric air-fuel ratio (solid lines), the $H_2$ concentration and the CO concentration, as well as the $O_2$ concentration, show sufficiently high values (for example, $O_2$ concentration: 2.0 vol %, $H_2$ concentration: 0.5 vol %, and CO concentration: 1.5 vol %).

Because the exhaust manifold 12 is of a reaction type as mentioned earlier, when carbon monoxide (CO), hydrogen ($H_2$), and oxygen ($O_2$) are discharged into the exhaust manifold 12 at the same time, CO, $H_2$, and $O_2$ will well experience an oxidation reaction (combustion) to a certain degree at the exhaust junction 12a. As the exhaust gas contains unburned HC, this unburned HC will likewise well experience an oxidation reaction (combustion) at the exhaust junction 12a. This raises the exhaust temperature to a certain degree and this reaction heat increases the temperature of the exhaust-gas purifying catalyst device 30.

However, the compression S/L mode is carried out when the operation in the low-exhaust-temperature operation mode has been performed over the predetermined timer time T1 and the exhaust temperature Tex is very low. Therefore, the reaction in the exhaust manifold 12 does not progress much, so that the increased exhaust temperature does not bring about a sufficient effect in raising the temperature of the exhaust-gas purifying catalyst device 30.

Accordingly, most of CO, $H_2$, and $O_2$ pass through the exhaust pipe 20 and reach the exhaust-gas purifying catalyst device 30.

Generally, the selective reduction type NOx catalyst 30a and the three-way catalyst 30b in the exhaust-gas purifying catalyst device 30 both have capabilities to retain $O_2$ within themselves under the excess oxygen atmosphere so that the retained $O_2$ oxidizes emissions such as CO and make them unharmful.

If CO or $H_2$ and $O_2$ coexist as mentioned above, the catalytic action causes CO or $H_2$ to be well oxidized, generating a reaction heat. This reaction heat raises the temperature of the exhaust-gas purifying catalyst device 30.

When the operation in the low-exhaust-temperature operation mode has continued over the predetermined timer time T1 and the exhaust temperature Tex becomes very low, therefore, switching the operation mode to the compression S/L mode causes CO, $H_2$, and $O_2$ to be simultaneously fed to the exhaust-gas purifying catalyst device 30. The reaction heat generated by the oxidation reaction of CO or $H_2$ can quickly and adequately increase the temperature of the exhaust-gas purifying catalyst device 30 or the temperatures of the selective reduction type NOx catalyst 30a and three-way catalyst 30b.

Figure 5:
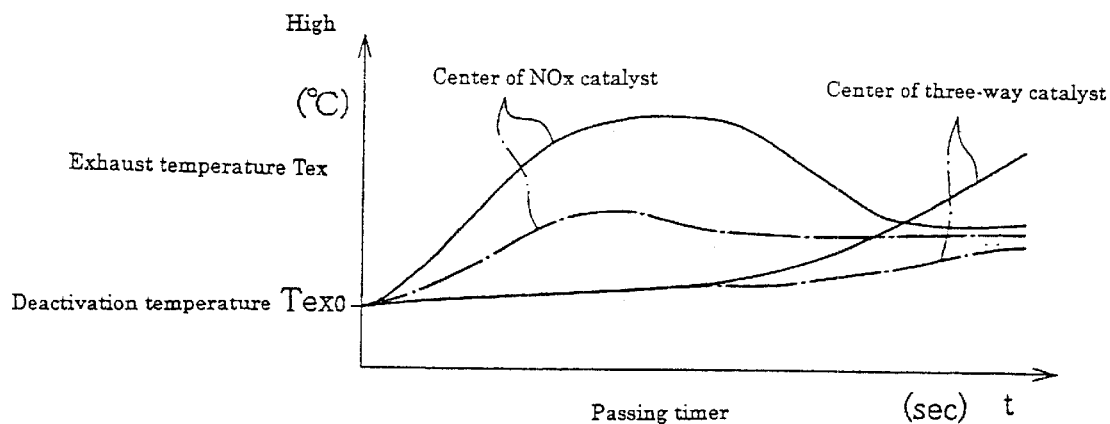
FIG. 5 is a time chart showing time-dependent changes in exhaust temperature Tex at the center portion of a selective NOx catalyst and at the center portion of a three-way catalyst in a case (solid lines) where an operation in compression S/L mode is performed based on the deactivation suppression control shown in FIG. 2 in comparison with those in a case (one-dot chain lines) where the conventional uniform combustion operation is performed.

In FIG. 5, the solid lines show time-dependent changes in the exhaust temperature Tex at the center portion of the selective reduction type NOx catalyst 30a and at the center portion of the three-way catalyst 30b in the case where the selective reduction type NOx catalyst 30a and the three-way catalyst 30b are provided the exhaust-temperature sensors and the operation in compression S/L mode according to this invention is performed after the exhaust temperature Tex becomes equal to or lower than the predetermined value (deactivation temperature) $T_{ex0}$, while the one-dot chain lines show similar time-dependent changes in the case where the uniform premix combustion operation is performed as in the prior art. As illustrated in this diagram, the operation in the compression S/L mode (solid lines) raises the exhaust temperature Tex to a high temperature range faster than the uniform premix combustion (one-dot chain lines), resulting in faster rising of the temperatures of the selective reduction type NOx catalyst 30a and the three-way catalyst 30b.

In the figure, the exhaust temperature Tex at the center portion of the three-way catalyst 30b rises with some delay from the rising of the exhaust temperature Tex at the center portion of the selective reduction type NOx catalyst 30a. This is because the three-way catalyst 30b is located at the downstream of the selective reduction type NOx catalyst 30a, so that most of CO, $H_2$, and $O_2$ react first in this NOx catalyst 30a, raising the temperature of the NOx catalyst 30a, and then the temperature of the three-way catalyst 30b is raised by the excess reaction heat acquired after the temperature of the NOx catalyst 30a has become sufficiently high.

In this case, the overall air-fuel ratio is a value (e.g., 14.7 to 16) near the stoichiometric air-fuel ratio (14.7) in the compression S/L mode. Unlike in the prior art, the temperature of the exhaust-gas purifying catalyst device 30 can be increased without requiring execution of the uniform premix combustion (e.g., the intake O/L mode operation) for a long period of time or continuous sub injection until the catalyst device becomes active, i.e., without impairing fuel consumption.

Figure 6:
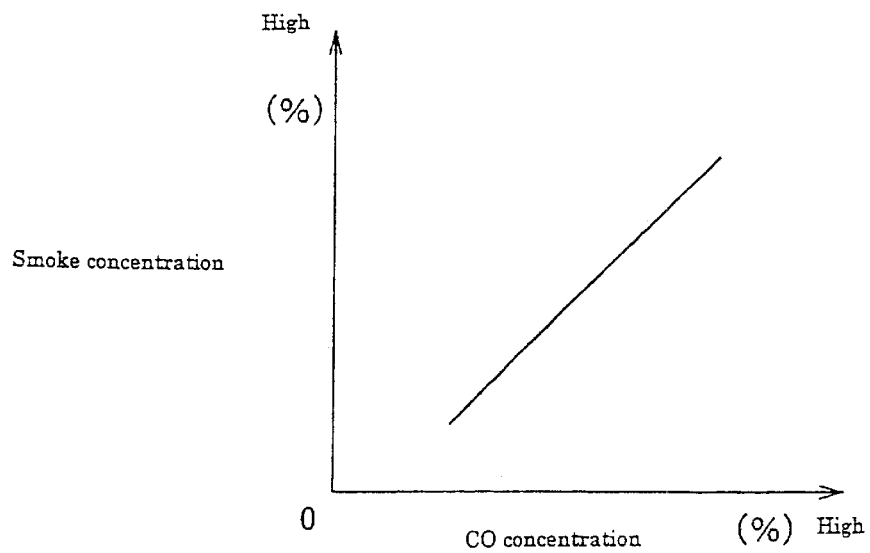
FIG. 6 is a diagram depicting the relationship between the CO concentration and smoke concentration.

When the operation mode is switched to the compression S/L mode, stratified combustion causes a locally-rich air-fuel ratio state, thus locally producing a large amount of CO. This may raise a so-called smoke problem. However, the CO concentration is normally almost proportional to the smoke concentration as shown in FIG. 6; as the amount of CO increases, the amount of smoke does too. That is, as the air-fuel ratio in the compression S/L mode is set to the lean air-fuel ratio side, making the amount of fuel injection smaller, the amount of CO generated decreases. This can suppress the amount of generation of smoke.

In view of the above, in this compression S/L mode, the air-fuel ratio is not set to a rich air-fuel ratio side, but set to a slight lean air-fuel ratio (e.g., 14.7 to 16) which provides sufficient CO while suppressing the generation of smoke as much as possible.

It is known that the amount of CO generated and the amount of smoke generated have a significant correlation with the ignition timing and fuel injection timing (actually the injection end timing), particularly, with the interval between the ignition timing and the injection end timing. In this embodiment, therefore, the ignition timing and the injection end timing are set to such optimal values as to be able to provide a sufficient amount of CO while reducing the generation amount of smoke.

Figure 7:
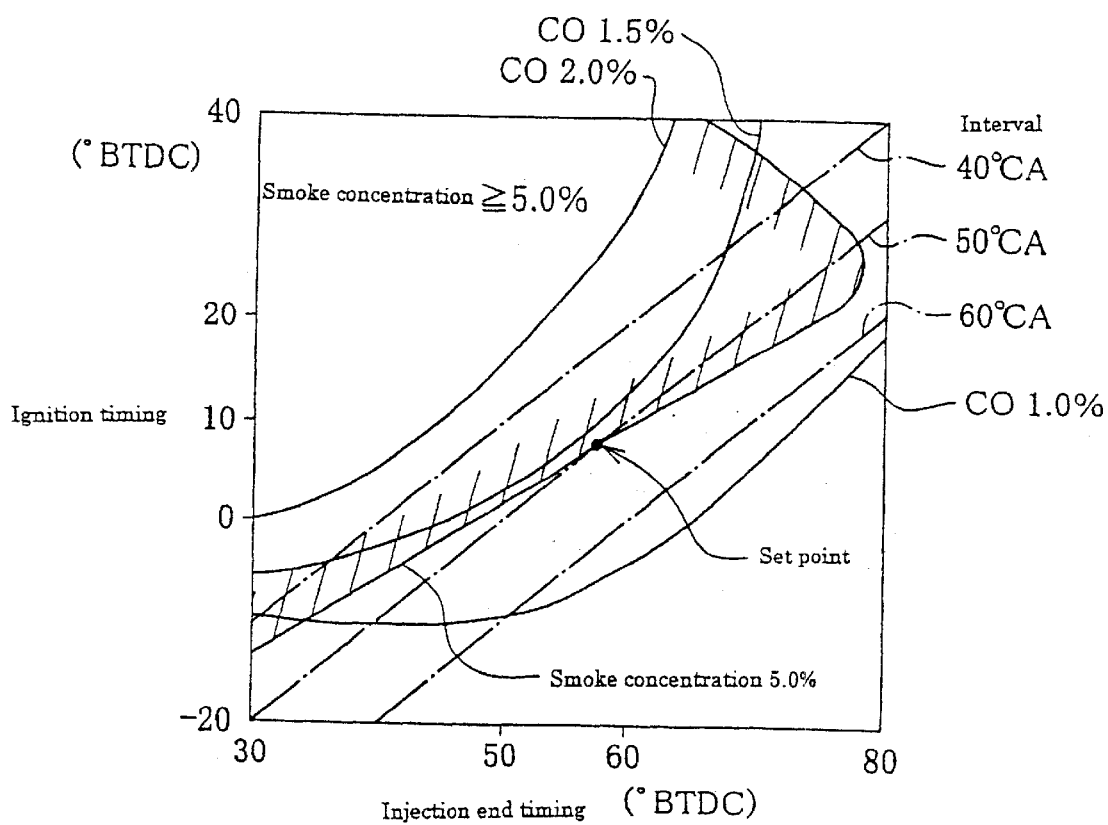
FIG. 7 is a map illustrating the relationship among the ignition timing, the injection end timing, the interval (indicated by one-dot chain lines) between the ignition timing and the injection end timing, the CO concentration (solid lines) and smoke concentration (solid line with hatching) in a case where the air-fuel ratio is constant (e.g., 15)

FIG. 7 shows a map illustrating the relationship among the ignition timing, the injection end timing, the interval (indicated by one-dot chain lines) between the ignition timing and the injection end timing, the CO concentration (solid lines), and smoke concentration (solid line with hatching) in the case where the air-fuel ratio is constant (e.g., 15). Actually, the optimal ignition timing and injection end timing are set based on this map. Specifically, a reference value for the smoke concentration has been set to a level below which no smoke can be seen by eyes (e.g., about 5.0%), and the ignition timing and injection end timing (set points), which maximize the generation amount of CO and set the CO concentration to a high value (e.g., near 1.5%) when one wants to suppress the generation amount of smoke to the reference value are read from the map (changing means for controlling an interval between an injection timing and an ignition timing). With those set points, the optimal ignition timing becomes, for example, 5° BTDC while the optimal injection end timing becomes, for example, 55° BTDC, yielding the interval of 50° CA (crank angle) between the ignition timing and the injection end timing from this figure.

Although the optimal ignition timing and optical injection end timing are set in such a way that the smoke concentration becomes the reference value (e.g., about 5.0%), the ignition timing and the injection end timing may be so set as to produce CO as much as possible in consideration of the generation amount of CO and the generation amount of smoke or may be so set as not to produce smoke as much as possible.

Specifically, as illustrated in the same figure, when one wants to increase the generation amount of CO, the interval between the ignition timing and the injection end timing has only to be set small, whereas it is desirable to reduce the generation amount of smoke, the interval between the ignition timing and the injection end timing has only to be set large. Practically speaking, if the interval between the ignition timing and the injection end timing lies in a range 50° CA about 10°, i.e., in a range from 40° CA to 60° CA, sufficient CO can be obtained while reducing the generation amount of smoke. In other words, the interval between the ignition timing and the injection end timing should fall in the range from 40° CA to 60° CA in the compression S/L mode.

When the operation in the low-exhaust-temperature operation mode is idling, for example, if the operation mode is changed to the compression S/L mode, this idling state should be maintained. It is therefore necessary to set the amount of air bypassing in the bypass passage (not shown) formed to bypass the throttle valve 11 and to set the engine speed Ne to a predetermined idling speed.

When the operation mode is the compression L mode, normally, an EGR valve (not shown) is opened to perform exhaust gas recirculation (EGR) in order to reduce NOx. When the compression S/L mode takes place, the EGR valve is closed to carry out no EGR in order to suppress a variation in air-fuel ratio or the like.

When the operation in the compression S/L mode is carried out in step S20 in FIG. 2 to raise the temperature of the exhaust-gas purifying catalyst device 30 in the above-described manner, the flow advances to step S22.

In step S22, it is determined if the count of the timer T has reached a predetermined timer time T2, i.e., if the operation in the compression S/L mode has continued over the predetermined timer time T2. The predetermined timer time T2, like the predetermined timer time T1, has previously been set based on the experimental results or the like to such a length that the temperature of the exhaust-gas purifying catalyst device 30 or the exhaust temperature Tex is assumed to have risen to a predetermined value $T_{ex1}$ as a result of the execution of the operation in the compression S/L mode after the operation in the low-exhaust-temperature operation mode. When the decision result is "NO," the flow proceeds through step S16 to step S20 to keep the operation in the compression S/L mode. When the decision result is "YES" or it is determined that the count of the timer T has reached the predetermined timer time T2 and the operation in the compression S/L mode has continued over the predetermined timer time T2 measured (see (c) in FIG. 3), on the other hand, the operation in the compression S/L mode is terminated and the flow advances to step S24.

In step S24, the operation mode is set back to the original operation mode. That is, the operation in the low-exhaust-temperature operation mode is resumed.

Second Embodiment

The following describes the second preferred embodiment where the deactivation suppression control is carried out using an exhaust-temperature sensor control instead of the timer control employed in the first preferred embodiment.

Figure 8:
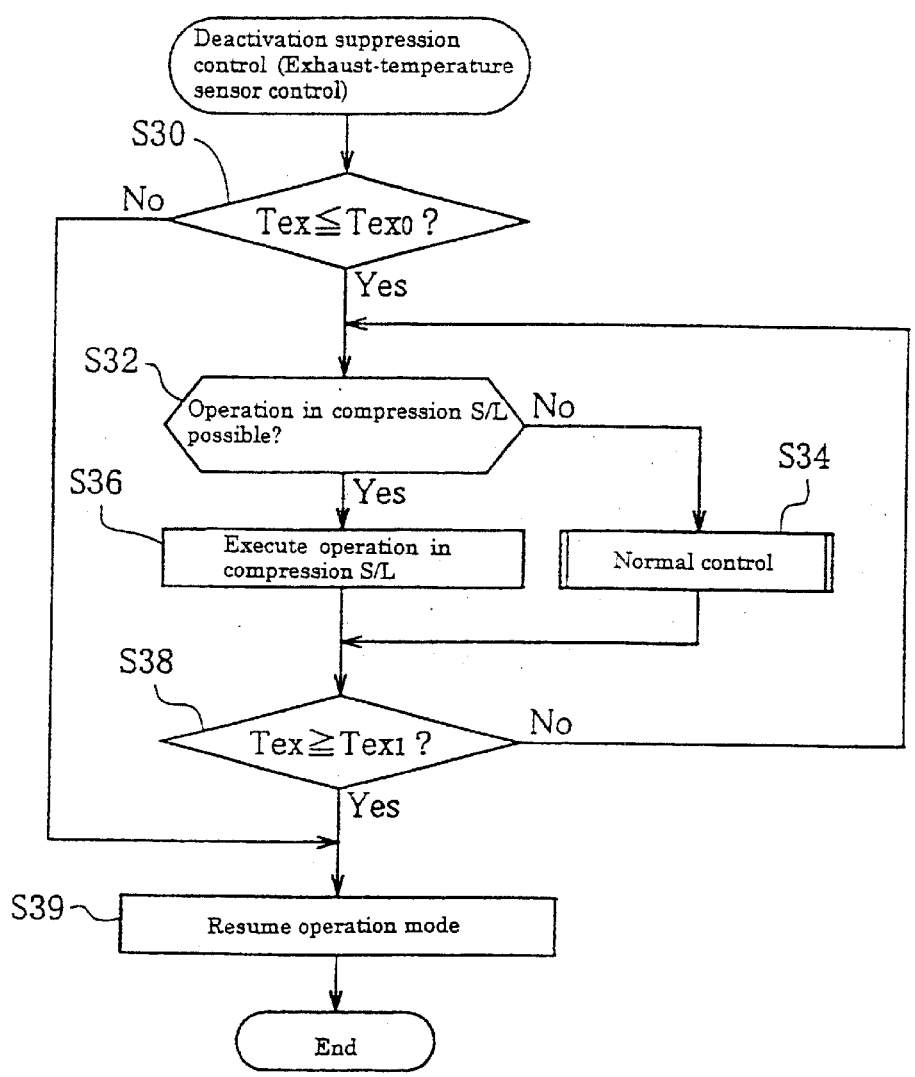
FIG. 8 is a flowchart illustrating a control routine for a deactivation suppression control (exhaust-temperature sensor control) using an exhaust-temperature sensor according to a second embodiment of this invention.

FIG. 8 presents a flowchart illustrating a control routine for the deactivation suppression control based on an exhaust-temperature sensor control in the case where the exhaust-gas purifying catalyst device 30 is cooled down while the engine 1 is running. The following description will be given along the flowchart in FIG. 8 while also referring to the time chart in FIG. 3.

In the first step S30, it is determined if the execution of the operation in a low-exhaust-temperature operation mode has lowered the exhaust temperature Tex, detected by the exhaust-temperature sensor 32, to or below the aforementioned predetermined value (deactivation temperature) $T_{ex0}$ (see (b) in FIG. 3). That is, while it is determined whether or not to execute the compression S/L mode basically based on the exhaust temperature Tex predicted from the count of the timer T in the first preferred embodiment, the exhaust temperature Tex is directly detected for the discrimination in this step.

When the decision result in step S30 is "NO," the flow goes to step S39 to perform no operation in the compression S/L mode but keep the operation in the operation mode that has been performed before the execution of the deactivation suppression control.

When the decision result is "YES" and it is determined that the exhaust temperature Tex is equal to or lower than the predetermined value (deactivation temperature) $T_{ex0}$, on the other hand, the flow advances to step S32 to determine whether or not the operation in the compression S/L mode can be carried out as in the first embodiment. Because the decision conditions in this case are the same as have been explained earlier, their description will not be repeated.

When the decision result in step S32 is "NO," the flow advances to step S34 to implement the normal control as in the first embodiment. When the decision result in step S32 is "YES," on the other hand, the flow advances to step S36 to start the operation in the compression S/L mode. As the contents of the compression S/L mode have already been discussed, their description will be omitted.

After the operation in the compression S/L mode is performed to increase the temperature of the exhaust-gas purifying catalyst device 30 in step S36, the flow advances to step S38.

In step S38, it is determined if the exhaust temperature Tex, detected by the exhaust-temperature sensor 32, has become equal to or higher than the aforementioned predetermined value $T_{ex1}$ (see (b) in FIG. 3). That is, while it is determined whether or not to terminate the compression S/L mode basically based on the exhaust temperature Tex predicted from the count of the timer T in the first embodiment, the exhaust temperature Tex is directly detected to determine the termination of the compression S/L mode in this step.

When the decision result in step S38 is "NO," the flow goes through step S32 to step S36 to keep the operation in the compression S/L mode. When the decision result in step S38 is "YES," i.e., when it is determined that the continuous operation in the compression S/L mode has made the exhaust temperature Tex equal to or higher than the predetermined value $T_{ex1}$ (see (b) in FIG. 3), on the other hand, the operation in the compression S/L mode is terminated and the flow advances to step S39.

In step S39, as mentioned above, the operation mode is set back to the one that has been performed before the execution of the deactivation suppression control. In this case, the operation in the low-exhaust-temperature operation mode is resumed.

This control allows the operation in the compression S/L mode to be adequately performed as needed, so that the temperature of the exhaust-gas purifying catalyst device 30 can be raised without impairing the fuel consumption and while suppressing the generation of smoke.

Third Embodiment

The following discusses temperature raising control for the exhaust-gas purifying catalyst device 30 when the engine 1 is cold-started.

Figure 9:
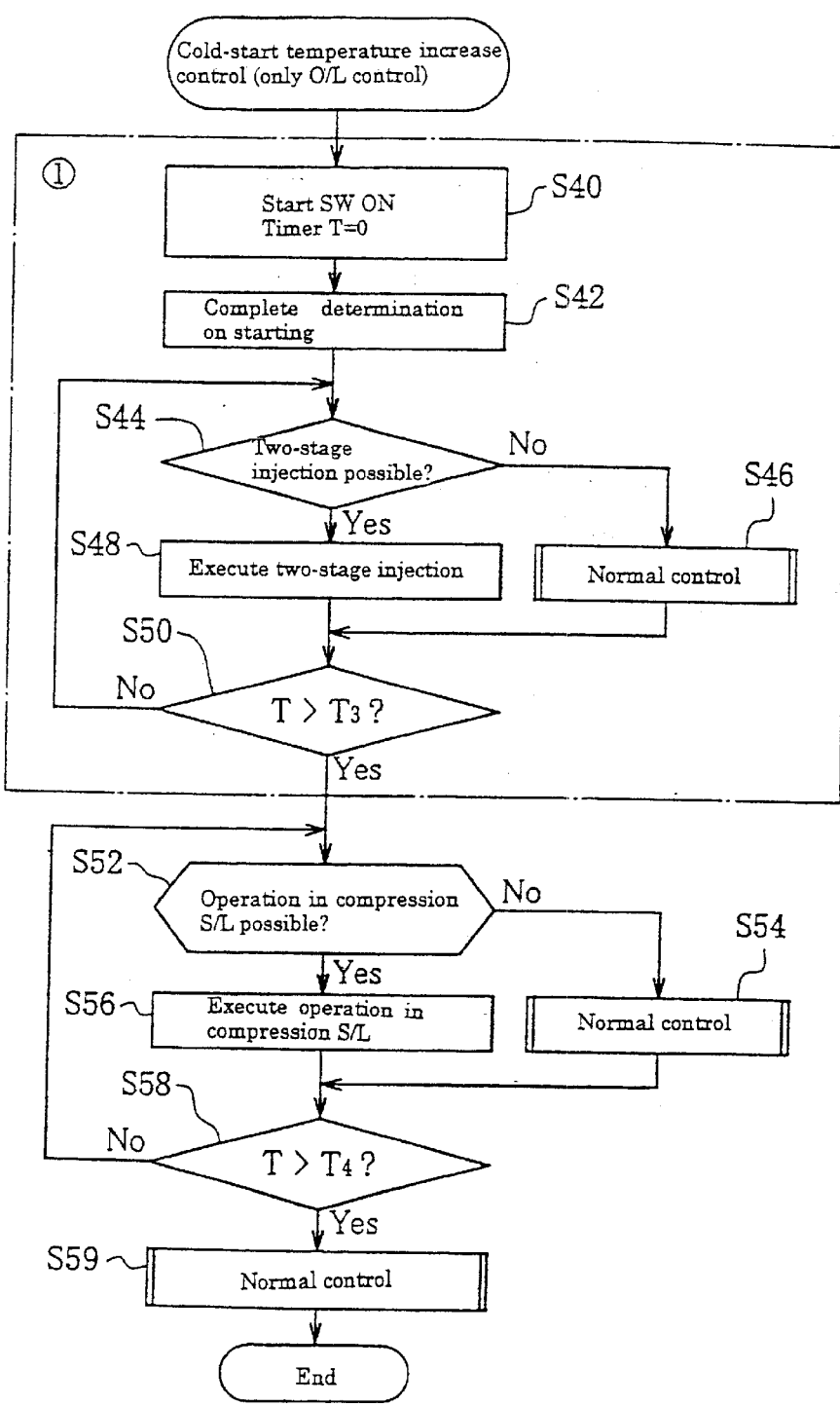
FIG. 9 is a flowchart illustrating a control routine for a case where open-loop control on an operation in compression S/L mode is performed under cold-start temperature increase control using a timer according to a third embodiment of this invention.
Figure 10:
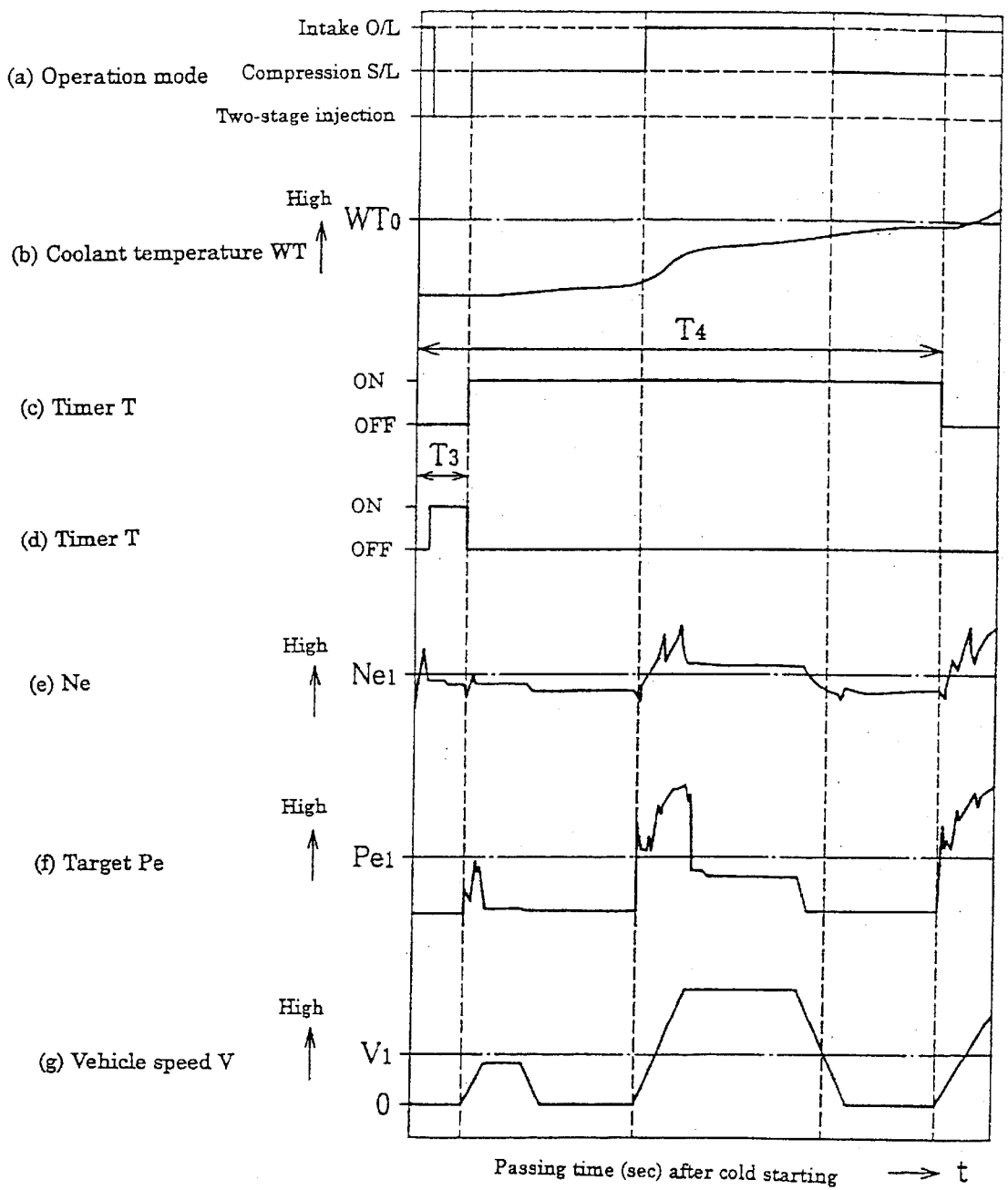
FIG. 10 is a time chart showing the control contents of the cold-start temperature increase control in FIG. 9.

FIG. 9 presents a flowchart illustrating a control routine for the case of executing an operation in the compression S/L mode by an open-loop control (O/L control) under a timer control in the temperature raising control when the engine 1 is cold-started, i.e., in a cold-start temperature increase control to raise the temperature of the exhaust-gas purifying catalyst device 30 to a predetermined activation temperature from the low-temperature state. FIG. 10 presents a time chart showing the control contents of the cold-start temperature increase control. The third preferred embodiment will now be discussed with reference to the flowchart in FIG. 9 and the time chart in FIG. 10.

First, in step S40, when it is determined that the start switch (start SW) or ignition key (not shown) has been turned on and the engine 1 has started, the timer T used in this routine is reset to "0," and the Timer T starts counting. When it is determined in step S42 that, for example, the engine speed Ne has reached a predetermined value $N_{e1}$ greater than the idling speed and the start determination is completed, the flow advances to step S44. Note that as shown in (a) in FIG. 10, the operation mode is set to the intake O/L mode to feed sufficient fuel for starting the engine 1 until the engine speed Ne reaches the predetermined value $N_{e1}$ since the activation of the engine 1.

In step S44, it is determined if the aforementioned two-stage injection can be carried out.

When the temperature of the exhaust-gas purifying catalyst device 30 is very low and the catalyst device 30 is not sufficiently active as in the case of cold starting, even the operation in the compression S/L mode is not good enough to promote the catalyst-oriented oxidation reaction. According to the third embodiment, therefore, a two-stage injection is implemented prior to the operation in the compression S/L mode in such a case, so that the temperature of the catalyst device 30 is raised (preheated) to a certain level by the exhaust temperature. In this step S44, it is determined whether or not the two-stage injection can be performed.

In this determination, as in the decision on whether or not to perform the compression S/L mode, it is determined if the unillustrated idle switch is OFF and the engine speed Ne, the target average effective pressure Pe, and the vehicle speed V are equal to or lower than the respective predetermined values. It is also determined if the coolant temperature information WT from the coolant-temperature sensor 14 is equal to or lower than the temperature that suggests that the engine 1 has been warmed up or a warm-up temperature WT0. The flow also includes the last decision on the coolant temperature information WT is to particularly prevent the temperature of the exhaust-gas purifying catalyst device 30 from rising excessively.

When the decision result in step S44 is "NO" or it is determined that two-stage injection should not be executed due to possible insufficient torque and excessive temperature rise, the normal control is carried out in step S46. That is, the engine 1 is run based on the aforementioned fuel injection mode map.

When the decision result in step S44 is "YES" or it is determined that two-stage injection can be performed because there is no possibility of insufficient torque and excessive temperature rise, the two-stage injection is carried out in step S48 (see (a) in FIG. 10). Specifically, after a main injection for a main combustion is performed in the intake stroke or compression stroke, a sub-injection is performed in the expansion stroke to feed additional fuel (additional-fuel control means). This causes unburned fuel components (essentially HC) to be well reacted (burned) by the action of the reaction type exhaust manifold, thus increasing the exhaust temperature. This raises the temperature of the exhaust-gas purifying catalyst device 30.

In the next step S50, it is determined if the count of the timer T has reached a predetermined timer time (predetermined period) T3 since the start switch or ignition key has been turned on. The predetermined timer time T3 has previously been set based on the experimental results or the like to a length long enough for the temperature of the exhaust-gas purifying catalyst device 30 to raise to the level that starts oxidation reaction in the catalyst device 30 when the mode is switched to the compression S/L mode. When the decision result is "NO," the flow advances through step S44 to step S48 to maintain the two-stage injection. When the decision result is "YES," i.e., when it is determined that the count of the timer T has reached the predetermined timer time T3, on the other hand, the flow advances to step S52.

In step S52, it is determined whether or not the operation in the compression S/L mode can be performed as in the first and second embodiments. In the third embodiment, the decision conditions include a condition for checking if the coolant temperature information WT is equal to or lower than the warm-up temperature $WT_o$, as used in the aforementioned decision on the execution of two-stage injection, and a condition for checking if the total execution time for two-stage injection is equal to or greater than a predetermined time t3 in addition to those concerning the engine speed Ne, the target average effective pressure Pe, and the vehicle speed V. Specifically, this step makes a decision on whether or not the engine speed Ne is equal to or lower than the predetermined value $N_{e1}$ that is greater than the idling speed, whether or not the target average effective pressure Pe is equal to or lower than a predetermined value $P_{e1}$, and whether or not the vehicle speed V is equal to or lower than a predetermined value V1 (see (e), (f), and (g) in FIG. 10), and makes a decision on whether or not the coolant temperature WT is equal to or lower than the warm-up temperature $WT_o$ (see (b) in FIG. 10) and a decision on whether or not the total execution time for two-stage injection is equal to or greater than the predetermined time t3 (t3<T3) (see (d) in FIG. 10).

The decision conditions include the last decision on the total execution time in consideration of the following probable case. The result of the decision in the step S44 may temporarily become "NO" due to a change in the operational state while the timer T is counting the predetermined timer time T3, so that two-stage injection is interrupted. In this case, the temperature of the exhaust-gas purifying catalyst device 30 may not rise sufficiently through the two-stage injection. Under this situation, the operation in the compression S/L mode may not bring about a sufficient temperature raising effect. That is, when the total execution time for two-stage injection is less than the time long enough to raise the temperature of the catalyst device 30 to a sufficient level or shorter than the predetermined time t3, it can be assumed that the effect of the operation in the compression S/L mode is insufficient. If such a case occurs, the operation in the compression S/L mode is not carried out.

When the decision result in step S52 is "NO," the flow advances to step S54 to implement the normal control (e.g., the intake O/L mode operation) as done in the previous embodiments. When the decision result in step S52 is "YES," on the other hand, the flow moves to step S56 to execute the operation in the compression S/L mode as in the first and second embodiments (see (a) in FIG. 10).

As the two-stage injection is performed first and followed by the operation in the compression S/L mode, an oxidation reaction of CO and $H_2$ is well promoted in the exhaust-gas purifying catalyst device 30, despite the cold starting, so that the reaction heat can efficiently and quickly raise the temperature of the catalyst device 30 or the temperatures of the selective reduction type NOx catalyst 30a and the three-way catalyst 30b, as in the case of deactivation suppression control in the first and second embodiments.

Figure 11:
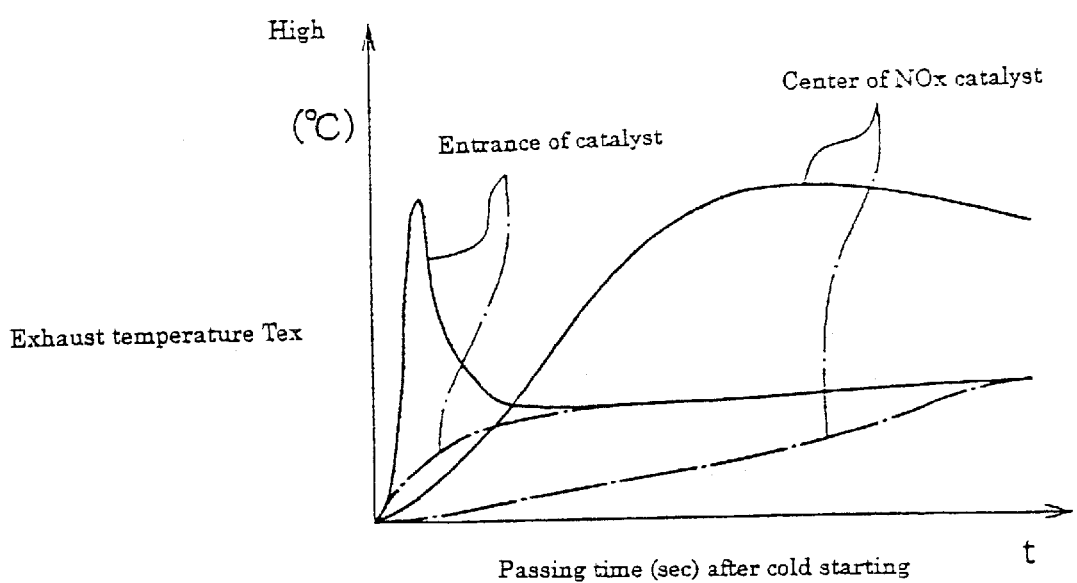
FIG. 11 is a time chart showing time-dependent changes in exhaust temperature Tex at the entrance and the center portion of a selective NOx catalyst in a case (solid lines) where injection is carried out in two stages at the time an operation in compression S/L mode is performed based on the cold-start temperature increase control shown in FIG. 9 and those in a case (one-dot chain lines) where such two-stage injection is not performed.

FIG. 11 presents a time chart which illustrates time-dependent changes in exhaust temperature Tex at the entrance and the center portion of the selective reduction type NOx catalyst 30a in the case (solid lines) where two-stage injection is carried out at the time the operation in compression S/L mode is performed in comparison with those in the case (one-dot chain lines) where such two-stage injection is not performed. As illustrated in this figure, when two-stage injection is performed first at the time of cold starting, the raise in exhaust temperature caused by the two-stage injection rapidly increases the exhaust temperature Tex at the entrance of the selective reduction type NOx catalyst 30a, thus sufficiently preheating the NOx catalyst 30a. When the operation in the compression S/L mode is executed subsequently, the temperature of the NOx catalyst 30a rises very efficiently as in the case illustrated in FIG. 5. Although FIG. 11 does not show the results on the three-way catalyst 30b, the temperature of the three-way catalyst 30b likewise rises well as in the case shown in FIG. 5.

Figure 12:
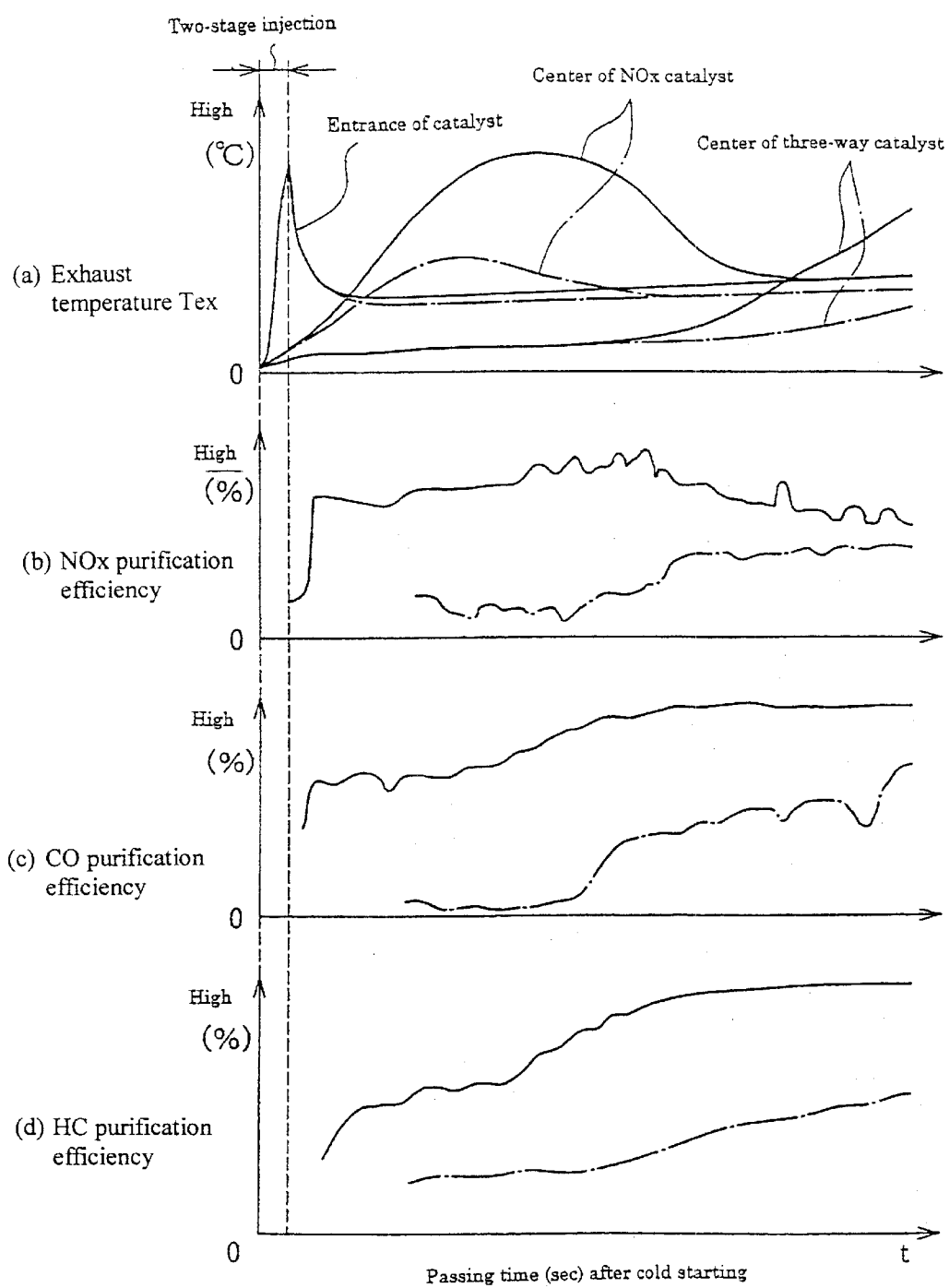
FIG. 12 is a time chart showing time-dependent changes (a) in exhaust temperature Tex at the entrance and the center portion of a selective NOx catalyst and at the center portion of a three-way catalyst, and time-dependent changes in the NOx purification efficiency (b), CO purification efficiency (c), and HC purification efficiency (d) of an exhaust-gas purifying catalyst device in a case (solid lines) where an operation in compression S/L mode is performed after two-stage injection based on the cold-start temperature increase control shown in FIG. 9 in comparison with those in a case (one-dot chain lines) where the conventional uniform combustion operation is performed.

FIG. 12 presents a time chart which shows time-dependent changes (a) in exhaust temperature Tex at the entrance and the center portion of the selective reduction type NOx catalyst 30a and at the center portion of the three-way catalyst 30b, in the case (solid lines) where the operation in the compression S/L mode is performed after executing two-stage injection over, for example, the predetermined timer time T3, in comparison with those in the case (one-dot chain lines) where the conventional uniform combustion operation is performed without carrying out the operation in the compression S/L mode, and time-dependent changes in the NOx purification efficiency (b), CO purification efficiency (c), and HC purification efficiency (d) of the exhaust-gas purifying catalyst device 30 in the case (solid lines) where the operation in the compression S/L mode is performed in comparison with the case (one-dot chain lines) where the uniform combustion operation is performed. As apparent from this diagram, at the time of cold starting, when the operation in the compression S/L mode (solid lines) is performed after the two-stage injection, HC, CO, and NOx all show high purifying efficiencies in a very short period of time immediately after the mode is switched from the two-stage injection, causing an active reaction on the catalysts. The temperature of the three-way catalyst 30b, together with that of the selective reduction type NOx catalyst 30a, rises more quickly than does in the case of executing the uniform premix combustion (one-dot chain lines) shown in FIG. 5.

Generally speaking, executing the two-stage injection this way feeds extra fuel that does not contribute at all to the output power of the engine 1 as mentioned earlier, which may result in higher fuel consumption. As apparent from FIG. 12, however, the time for the two-stage injection carried out to raise the temperature of the exhaust-gas purifying catalyst device 30 in this invention is very short, so that an increase in fuel consumption can be suppressed as much as possible as compared to the conventional case of continuously executing the two-stage injection over a long period of time.

That is, as the two-stage injection is carried out only for the minimum time required before performing the operation in the compression S/L mode (solid line), the temperature of the exhaust-gas purifying catalyst device 30 can be increased efficiently and quickly while suppressing an increase in fuel consumption very low at the time of cold starting.

After the operation in the compression S/L mode is performed to raise the temperature of the exhaust-gas purifying catalyst device 30 in step S56 in FIG. 9, the flow advances to step S58.

In step S58, it is determined if the count of the timer T has reached a predetermined timer time T4, i.e., if the operation in the compression S/L mode has continued over the predetermined timer time T4. The predetermined timer time T4, like the predetermined timer time T2, has previously been set based on the experimental results or the like to such a length that the temperature of the exhaust-gas purifying catalyst device 30 or the exhaust temperature Tex is assumed to have risen to the predetermined high temperature $T_{ex1}$ as a result of the execution of the two-stage injection and the operation in the compression S/L mode after cold starting. When the decision result is "NO," the flow proceeds through step S52 to step S56 to maintain the operation in the compression S/L mode. When the decision result is "YES" or it is determined that the count of the timer T has reached the predetermined timer time T4 and the operation in the compression S/L mode has continued over the predetermined timer time T4 measured (see (c) in FIG. 10), on the other hand, the operation in the compression S/L mode is terminated and the flow advances to step S59.

In step S59, the engine 1 is run under the normal control based on the fuel injection mode map (e.g., the intake O/L mode operation).

Fourth Embodiment

The following description of the fourth preferred embodiment discusses the case where the operation in the compression S/L mode, which is executed by the open-loop control (O/L control) under timer control in the cold-start temperature increase control in the third embodiment is replaced with the compression stroke $O_2$ feedback control (compression $O_2$-F/B control). That is, the operation is carried out in a compression $O_2$-F/B mode.

Figure 13:
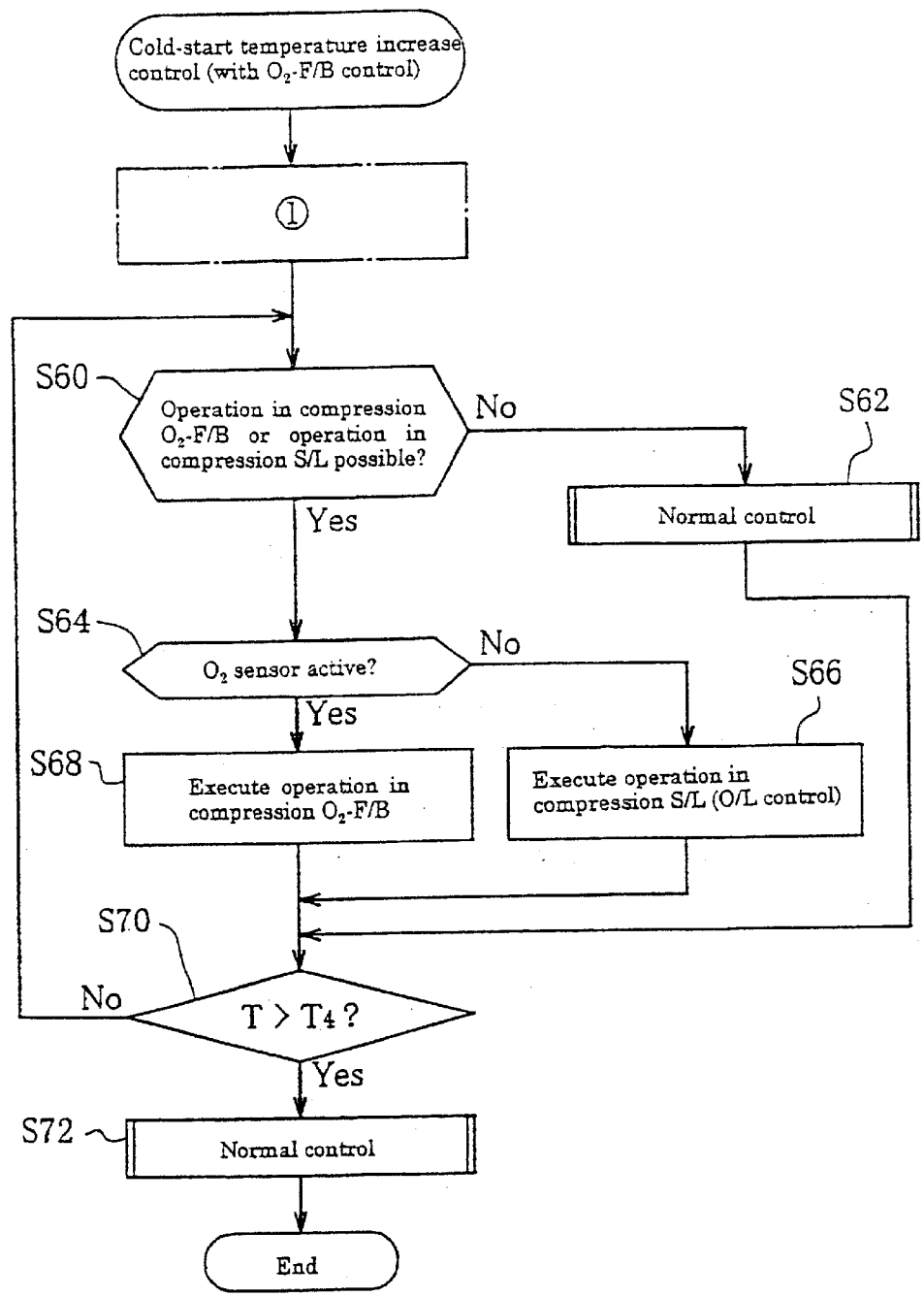
FIG. 13 is a flowchart illustrating a control routine for a case where an operation in compression $O_2$-F/B mode is performed under cold-start temperature increase control using a timer according to a fourth embodiment of this invention.
Figure 14:
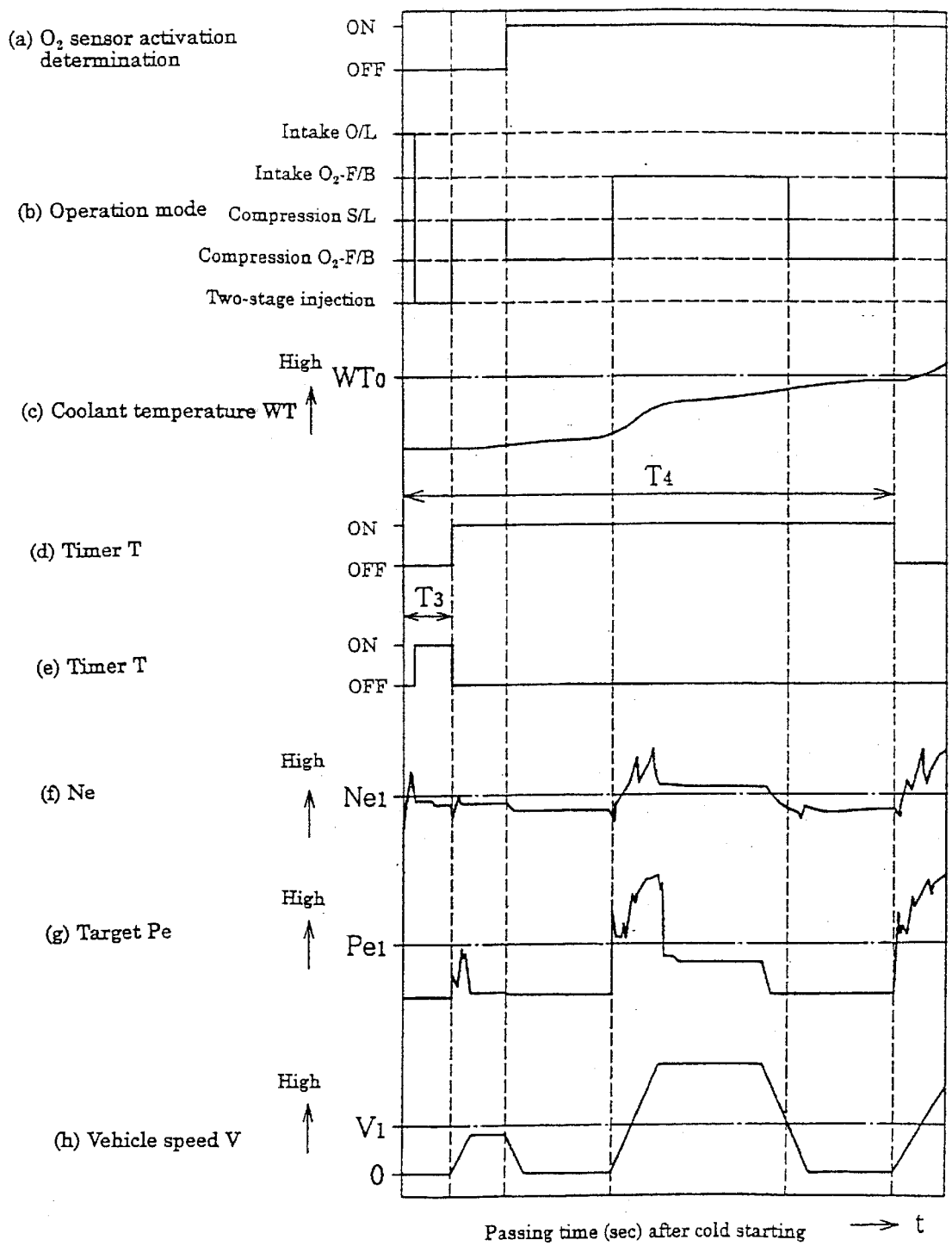
FIG. 14 is a time chart showing the control contents of the cold-start temperature increase control shown in FIG. 13.

FIG. 13 presents a flowchart illustrating a control routine for the case where the operation in the compression $O_2$-F/B mode is performed under timer control in the cold-start temperature increase control. FIG. 14 presents a time chart which shows the control contents of the cold-start temperature increase control in FIG. 13. The fourth embodiment will now be discussed with reference to the flowchart in FIG. 13 and the time chart in FIG. 14.

As the portion indicated by ① in FIG. 13 is the same as the range indicated by ① that covers steps S40 to S50 in FIG. 9 or the control procedures that concern the two-stage injection, its description will not be repeated. The following therefore discusses only those portions which differ from the third embodiment.

In step S60, it is determined if the operation in the compression $O_2$-F/B mode or compression S/L mode can be executed. The conditions for this decision are the same as those used in the third embodiment in determining if the operation in compression S/L mode can be performed (see (c), (f), (g), and (h) in FIG. 14). When the decision result is "NO," the normal control (e.g., the intake $O_2$-F/B mode operation) is performed in step S62 (see (b) in FIG. 14). When the decision result is "YES," on the other hand, the flow advances to step S64.

In step S64, it is determined whether or not the $O_2$ sensor 22 is active. The $O_2$ sensor 22 is generally designed to demonstrate the performance under a certain level of high temperature, so that the compression $O_2$-F/B control cannot be executed properly at a low temperature. In the step S64, therefore, it is determined if the $O_2$ sensor 22 is active. Specifically, this check can be made by checking, for example, whether or not the output voltage of the $O_2$ sensor 22 is greater than a predetermined output value at a rich air-fuel ratio, i.e., if it is greater than an activation decision voltage. When the decision result is "NO" or when it is determined that the $O_2$ sensor 22 is inactive (OFF) because of its low temperature, the flow advances to step S66 (see (a) in FIG. 14).

When the $O_2$ sensor 22 is inactive, it is not possible to adequately carry out the compression $O_2$-F/B control. If such is the case, therefore, the operation in the compression S/L mode is performed in step S66 as in the third embodiment (see (b) in FIG. 14).

When the decision result in step S64 is "YES," which means that the output voltage of the $O_2$ sensor 22 is greater than the activation decision voltage and the $O_2$ sensor 22 is active (ON), the flow advances to step S68 (see (a) in FIG. 14).

In step S68, the operation in the compression $O_2$-F/B mode is carried out (see (b) in FIG. 14). That is, a feedback control is executed in such a way that the air-fuel ratio becomes the stoichiometric air-fuel ratio based on the output information of the $O_2$ sensor 22.

As the feedback control is performed in the compression $O_2$-F/B mode so that the air-fuel ratio becomes the stoichiometric air-fuel ratio (14.7), CO, $H_2$, and $O_2$ are sufficiently produced in approximately the same way as in the case where the air-fuel ratio is set to a slight lean level (e.g., 14.7 to 16) in the compression S/L mode as illustrated in FIG. 4. In other words, even when the compression $O_2$-F/B mode is executed instead of the compression S/L mode, the temperature of the exhaust-gas purifying catalyst device 30 can be increased sufficiently.

In addition, executing such a feedback control (compression $O_2$-F/B control) can make the control precision extremely higher than the above-described O/L control in the compression S/L mode. That is, the operation in the compression $O_2$-F/B mode can enhance the control reliability and improve the efficiency of raising the temperature of the exhaust-gas purifying catalyst device 30.

When the operation in the compression S/L mode is carried out in step S66 in FIG. 13 or the operation in the compression $O_2$-F/B mode is carried out in step S68 in this manner to increase the temperature of the exhaust-gas purifying catalyst device 30, the flow advances to step S70.

In step S70, it is determined whether or not the count of the timer T has reached the predetermined timer time T4 or if the operation in the compression S/L mode or the operation in the compression $O_2$-F/B mode has continued over the predetermined timer time T4, as in the third embodiment. When the decision result is "NO," the flow goes through steps S60 and S64 to step S66 to resume the operation in the compression S/L mode or to step S68 to resume the operation in the compression $O_2$-F/B mode. When the decision result is "YES" or when it is determined that the count of the timer T has reached the predetermined timer time T4 (see (d) in FIG. 14), the operation in the compression S/L mode or the operation in the compression $O_2$-F/B mode is terminated. Then, the flow advances to step S72 to run the engine 1 under the normal control (e.g., the intake $O_2$-F/B mode operation) based on the fuel injection mode map.

Fifth Embodiment

The following discusses the fifth preferred embodiment in the case where the operation in the compression S/L mode, which is executed by the open-loop control (O/L control) under timer control in the cold-start temperature increase control in the fourth embodiment, is carried out under the exhaust-temperature sensor control instead of the timer control.

Figure 15:
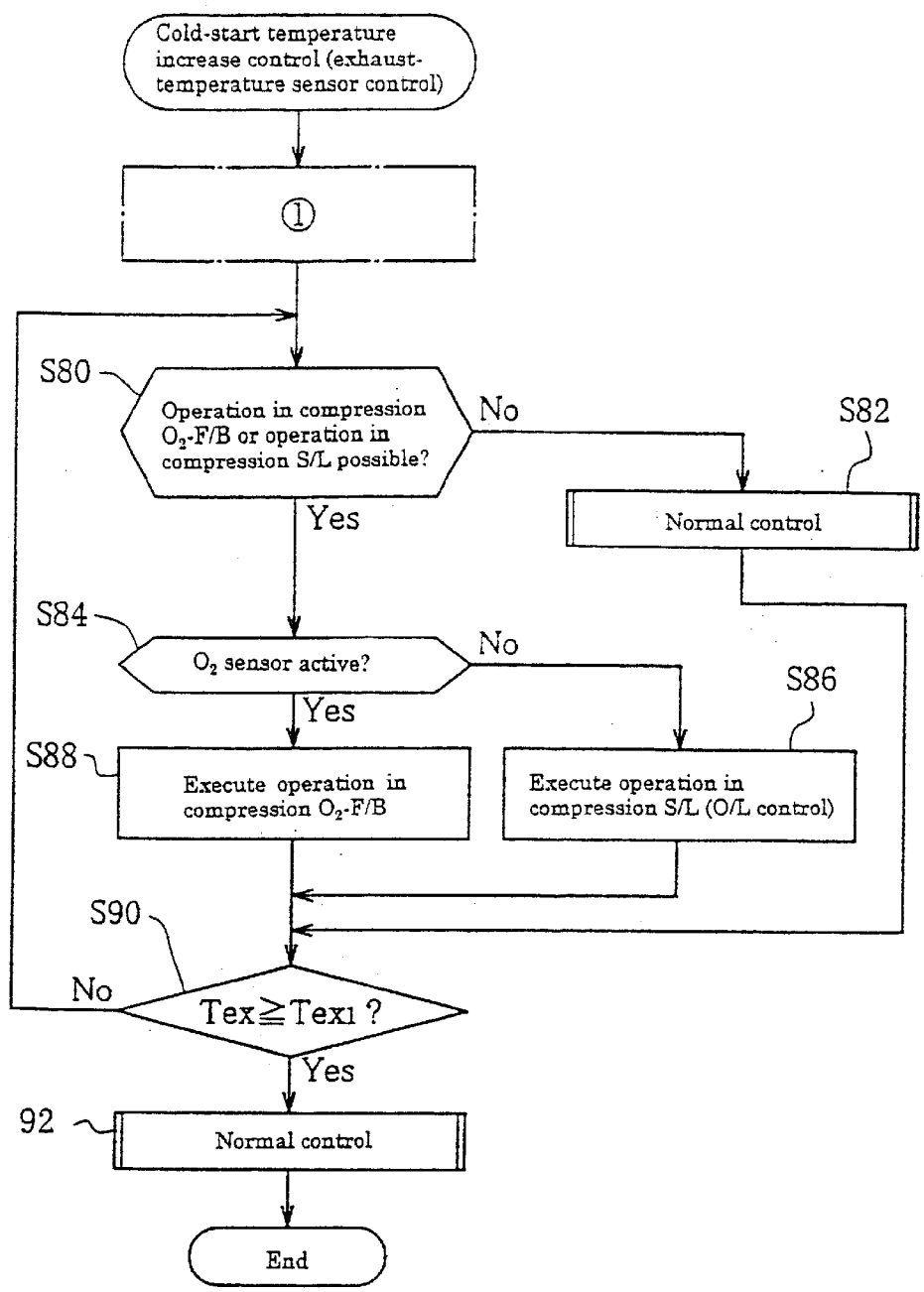
FIG. 15 is a flowchart illustrating a control routine for a case where an operation in compression $O_2$-F/B mode is performed under cold-start temperature increase control using an exhaust-temperature sensor according to a fifth embodiment of this invention.
Figure 16:
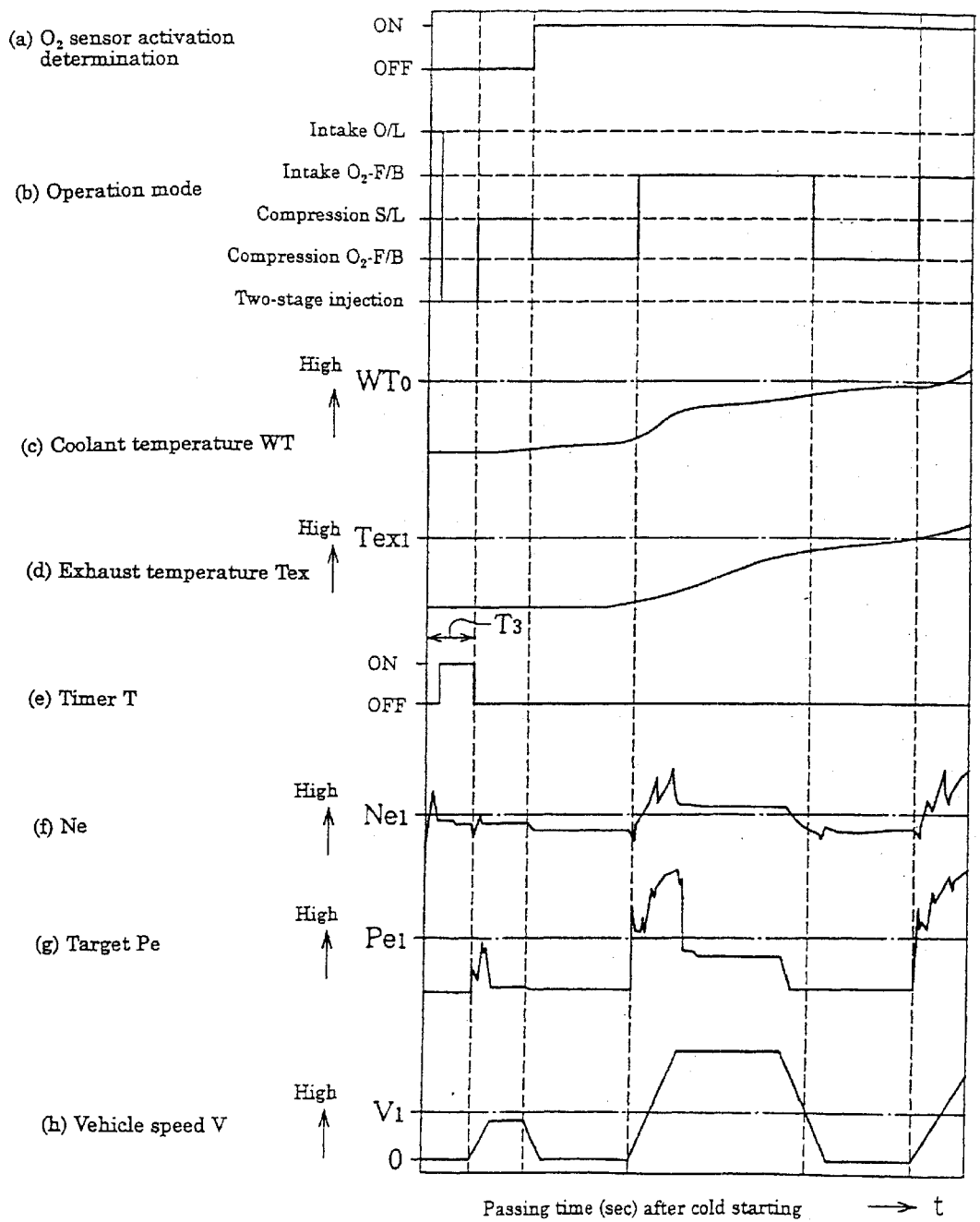
FIG. 16 is a time chart showing the control contents of the cold-start temperature increase control shown in FIG. 15.

FIG. 15 presents a flowchart illustrating a control routine for the case where the operation in the compression $O_2$-F/B mode is performed under the exhaust-temperature sensor in control cold-start temperature increase control. FIG. 16 presents a time chart which shows the control contents of the cold-start temperature increase control. The fifth embodiment will now be discussed with reference to the flowchart in FIG. 15 and the time chart in FIG. 16.

Because the portion indicated by ① in FIG. 15, like that of the fourth embodiment, is the same as the range indicated by ① that includes steps S40 to S50 in FIG. 9 or the control procedures that concern the two-stage injection in the third embodiment, its description will not be repeated. The following therefore discusses only those portions which differ from the third embodiment.

In step S80, it is determined if the operation in the compression $O_2$-F/B mode or compression S/L mode can be executed. As in the fourth embodiment, the conditions for this decision are the same as those used in the third embodiment in determining if the operation in the compression S/L mode can be performed (see (c), (f), (g), and (h) in FIG. 16).

When the decision result is "NO," the normal control (e.g., the intake O₂-F/B mode operation) is performed in step S82 (see (b) in FIG. 16). When the decision result is "YES," on the other hand, the flow advances to step S84.

In step S84, it is determined whether or not the O₂ sensor 22 is active as in the fourth embodiment. When the decision result is "NO" or when it is determined that the O₂ sensor 22 is inactive because of its low temperature, the flow advances to step S86 (see (a) in FIG. 16) where the operation in compression S/L mode is performed in step S86 as in the fourth embodiment (see (b) in FIG. 16).

When the decision result in step S84 is "YES," which means that the output voltage of the O₂ sensor 22 is greater than the activation decision voltage and the O₂ sensor 22 is active, the flow advances to step S88 (see (b) in FIG. 16) where the operation in the compression O₂-F/B mode is carried out (see (b) in FIG. 16) as in the fourth embodiment.

When the operation in the compression S/L mode is carried out in step S86 or the operation in the compression O₂-F/B mode is carried out to increase the temperature of the exhaust-gas purifying catalyst device 30 in step S88, the flow advances to step S90.

In step S90, it is determined whether or not the exhaust temperature Tex detected by the exhaust-temperature sensor 32 has become equal to or greater than the aforementioned predetermined value $T_{ex1}$ (see (d) in FIG. 16) as in the second embodiment. That is, while it is determined whether or not the compression O₂-F/B mode or the compression S/L mode should be terminated based on the exhaust temperature Tex that is estimated by using the count of the timer T in the fourth embodiment, this decision is made based on the exhaust temperature Tex that is directly detected, not estimated, by the exhaust-temperature sensor 32 in the fifth embodiment.

When the decision result in step S90 is "NO," the flow goes through steps S80 and S84 to step S86 to resume the operation in the compression S/L mode or to step S88 to resume the operation in the compression O₂-F/B mode. When the decision result is "YES" or when it is determined that the exhaust temperature Tex is equal to or higher than the predetermined value $T_{ex1}$ (see (d) in FIG. 16), the operation in the compression S/L mode or the operation in the compression O₂-F/B mode is terminated. Then, the flow advances to step S92 to run the engine 1 under the normal control (e.g., the intake O₂-F/B mode operation) based on the fuel injection mode map.

This design allows the operation in the compression S/L mode or the operation in the compression O₂-F/B mode to be adequately executed as needed. Accordingly, the temperature of the exhaust-gas purifying catalyst device 30 can be raised more efficiently without impairing the fuel consumption and while suppressing the generation of smoke, as in the fourth embodiment.

Incidentally, in the fourth and fifth embodiments, as apparent from the above, it is determined whether or not the O₂ sensor 22 is active by checking, for example, if the output voltage of the O₂ sensor 22 is greater than the predetermined output value at a rich air-fuel ratio or the activation decision voltage.

If, at the time of executing the two-stage injection, the overall air-fuel ratio is set to a lean air-fuel ratio and the compression S/L mode is carried out at a slight lean air-fuel ratio (14.7 to 16), there is no chance that the air-fuel ratio becomes a rich air-fuel ratio. This disables the decision on the activation of the O₂ sensor 22.

To cope with the above case, therefore, the fourth and fifth embodiments may employ O₂ sensor activation determining control which forcibly sets the air-fuel ratio to a rich air-fuel ratio in order to reliably enable the decision on the activation of the O₂ sensor 22. The following discusses the details of this O₂ sensor activation determining control.

Figure 17:
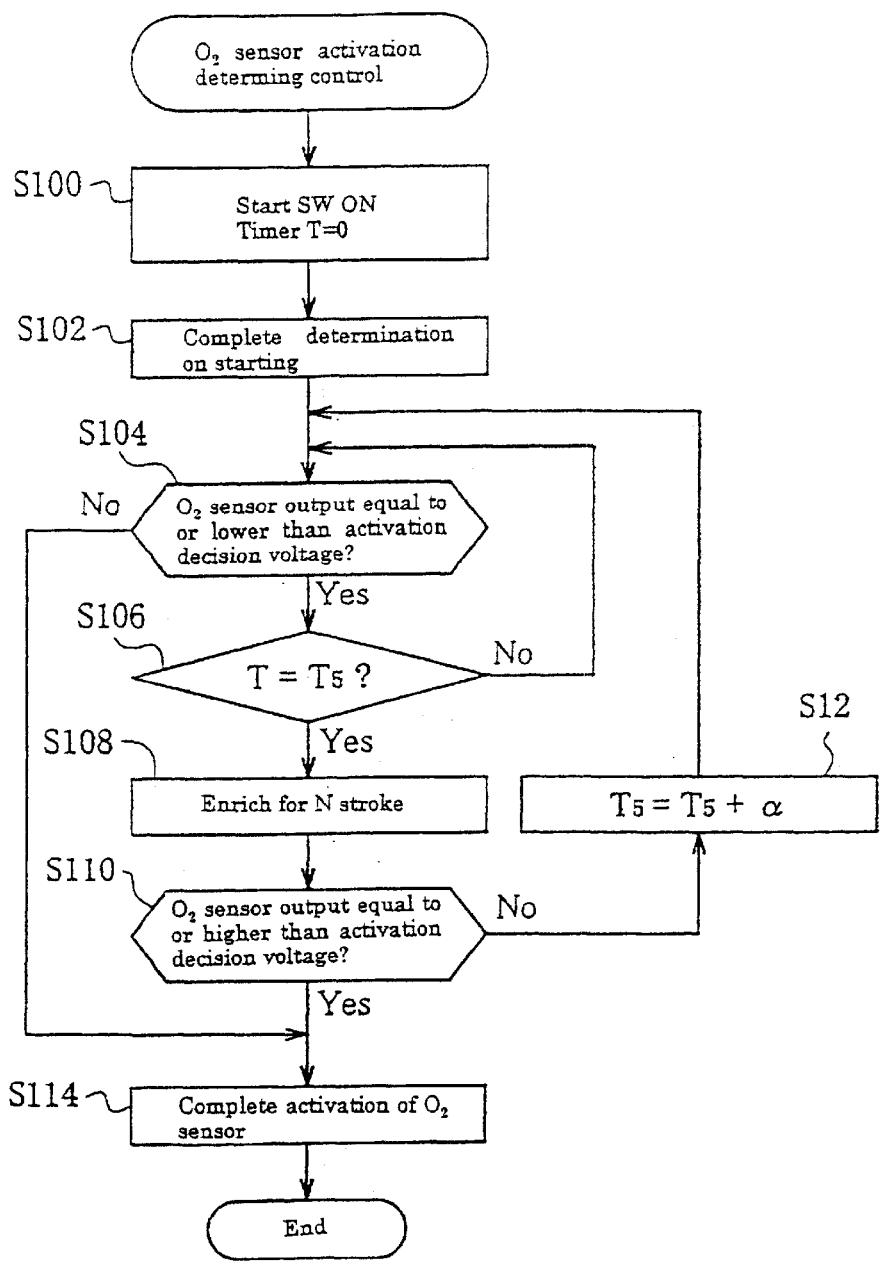
FIG. 17 is a flowchart illustrating a control routine for $O_2$ sensor activation determining control.

FIG. 17 presents a flowchart which illustrates a control routine for the O₂ sensor activation determining control. This control will be explained by referring to FIG. 17.

In step S100 in FIG. 17, as in step S40 in FIG. 9 of the third embodiment, when it is determined that the start switch (start SW) has been turned on and the engine 1 has started, the timer T used in this routine is reset to "0" and starts counting. When it is determined in step S102 that, for example, the engine speed Ne has reached the predetermined value $N_{e1}$ greater than the idling speed and the start determination is completed, the flow advances to step S104.

In step S104, it is determined if the output of the O₂ sensor 22 is equal to or lower than the aforementioned activation decision voltage. That is, it is determined in this step S104 whether or not the O₂ sensor 22 is active. When the decision result is "NO" or when it is determined that the O₂ sensor 22 is already sufficiently active, the flow advances to step S114 where it is determined that the activation of the O₂ sensor 22 is completed. When the decision result is "YES" or when it is determined that the O₂ sensor 22 is not active, the flow advances to step S106.

In step S106, it is determined whether or not the count of the timer T has reached a predetermined timer time T5 (e.g., 15 sec). That is, it is determined whether or not the O₂ sensor 22 is still inactive even after the predetermined timer time T5 (e.g., 15 sec) has passed since it was determined that the engine 1 had started. When the decision result is "NO," the flow returns to step S104 to determine again if the O₂ sensor 22 is active. When the decision result is "YES" or when it is determined that the O₂ sensor 22 is still inactive even after the passing of the predetermined timer time T5 (e.g., 15 sec) since it was determined that the engine 1 had started, the flow advances to step S108. If the air-fuel ratio is not made a rich air-fuel ratio but stays as a lean air-fuel ratio, the O₂ sensor 22 has not, naturally, become active yet, and the flow goes to step S108.

In step S108, the air-fuel ratio is forcibly made a rich air-fuel ratio (or is enriched) over N strokes (N being any integer). This forcibly permits a decision to be made if the O₂ sensor 22 is active.

In step S110, it is determined if the output voltage of the O₂ sensor 22 is equal to or greater than the activation decision voltage. When the decision result is "NO" or when it is determined that the O₂ sensor 22 has not been active yet, the predetermined timer time T5 is extended by a predetermined time α(T5=T5+α). Then, the flow goes through steps S104 and 106 to step S108 again where the air-fuel ratio is forcibly made a rich air-fuel ratio (is enriched).

When the decision result in step S104 is "YES" or when it is determined that the O₂ sensor 22 becomes sufficiently active, the flow advances to step S114 where it is determined that the activation of the O₂ sensor 22 is completed.

This control can provide an opportunity to surely make the air-fuel ratio to a rich air-fuel ratio even when, at the time of executing the two-stage injection, the overall air-fuel ratio is set to a lean air-fuel ratio and the operation in the compression S/L mode is carried out at a slight lean air-fuel ratio. This can ensure reliable determination on the activation of the O₂ sensor 22. According to the fourth and fifth embodiments, with the O₂ sensor 22 being active, it is always possible to effectively implement the operation in the compression O₂-F/B mode. This allows the temperature of the exhaust-gas purifying catalyst device 30 to efficiently rise without impairing the fuel consumption and while suppressing the generation of smoke.

This invention is not to be limited to the above-described embodiments, but may be modified in various other forms. For instance, although the exhaust-gas purifying catalyst device 30 in any of the above-described embodiments uses a combination of the selective reduction type NOx catalyst 30a and the three-way catalyst 30b, it is possible to use an absorption type NOx catalyst or the like which absorbents NOx in the exhaust gas when the exhaust air-fuel ratio is a lean air-fuel ratio and discharges and reduces the absorbed NOx when the air-fuel ratio is the stoichiometric air-fuel ratio or a rich air-fuel ratio. In other words, this invention concerns a technique of increasing the temperature of the exhaust-gas purifying catalyst device but is in no way limited to the types and the number of catalysts or the like.

Although the air-fuel ratio in the compression S/L mode is set to a slight lean air-fuel ratio (e.g., 14.7 to 16) in the individual embodiments, the air-fuel ratio may be set slightly on the rich side (e.g., about 14) to the stoichiometric air-fuel ratio based on the relationship between $O_2$ and CO in the exhaust gas from the engine 1 (see FIG. 4).

In the third to fifth embodiments, with regard to the two-stage injection control portion indicated by ① in FIG. 9, the execution time (predetermined period) for the two-stage injection is measured by the timer. However, the two-stage injection may be executed for the predetermined time by which the state where the exhaust-gas purifying catalyst device can have an oxidation reaction on the catalysts is detected based on the output value of the exhaust-temperature sensor or is estimated.

As specifically discussed above, the in-cylinder injection type internal combustion engine, according to this invention, achieves stratified combustion in such a way that the air-fuel ratio of the engine becomes a stoichiometric air-fuel ratio or gets in a vicinity thereof, it is possible to feed a large amount of carbon monoxide (CO) and oxygen ($O_2$) into the exhaust-gas purifying catalyst device at the same time to cause an oxidation reaction without impairing the fuel consumption. This can allow the temperature of the exhaust-gas purifying catalyst device to be increased efficiently by the reaction heat.

Further, when the stratified combustion is performed, the interval between the fuel injection timing and ignition timing is made longer, so that a sufficient time can be secured for atomization of injected fuel and the generation of smoke can be satisfactorily suppressed while adequately producing CO.

Furthermore, before the stratified combustion is carried out, an additional fuel is injected over a predetermined period of time in the expansion stroke after the main injection. This can permit the temperature of the catalyst device to be increased (preheated) by the exhaust heat whose temperature rises by the combustion of the additional fuel in the exhaust passage. It is therefore possible to efficiently cause an oxidation reaction when CO and $O_2$ are fed later and sufficiently and swiftly raise the temperature of the catalyst device at the time of cold starting.

What is claimed is:

1. An in-cylinder injection type internal combustion engine having fuel injection valves for injecting fuel directly into combustion chambers of said internal combustion engine, comprising:

an exhaust-gas purifying catalyst device, provided in an exhaust passage of the internal combustion engine, arranged to purify harmful components in an exhaust gas; and a control device for controlling fuel injection operating modes of the fuel injection valves, said control device including an additional fuel injection mode, which includes a main fuel injection for main combustion and additional fuel injection in an expansion stroke after said main injection, to preheat the temperature of said exhaust-gas purifying catalyst device following detection of a cold-start condition, and a temperature-increase control section, for operating in a reduced fuel consumption temperature increasing mode, which achieves stratified combustion in such a way that an air-fuel ratio of said internal combustion engine becomes a stoichiometric air-fuel ratio or in a vicinity thereof to further increase temperature of said exhaust-gas purifying catalyst device, wherein said control device operates in said additional fuel injection mode and then said reduced fuel consumption temperature increasing mode.

2. The in-cylinder injection type internal combustion engine according to claim 1, wherein said additional-fuel injection control section is activated over a predetermined period of time.

3. The in-cylinder injection type internal combustion engine according to claim 2, wherein said predetermined period of time is set equal to or less than approximately 15 seconds.

4. The in-cylinder injection type internal combustion engine according to claim 1, wherein said control section activates said additional-fuel injection control section after cold starting of said engine, and then activates said temperature-increase control section.

5. The in-cylinder injection type internal combustion engine according to claim 1, further comprising:

an exhaust-temperature sensor for detecting a temperature of exhaust gas; wherein said control device determines whether the detected temperature is equal to or lower than a first predetermined temperature; and said control device controls said temperature-increase section to achieve a stratified combustion mode in such a manner that an air-fuel ratio of the engine becomes a stoichiometric or in a vicinity thereof when it is determined that the detected temperature is lower than the predetermined temperature to increase the temperature of the exhaust gas.

6. The in-cylinder injection type internal combustion engine according to claim 5, wherein said stratified combustion mode is maintained until the detected temperature increases above a second predetermined temperature.

7. The in-cylinder injection type internal combustion engine according to claim 1, wherein said normal injection mode is an open control loop fuel injection.

8. The in-cylinder injection type internal combustion engine according to claim 1, wherein said control device operates in said normal injection mode before said additional fuel injection mode following a cold-start condition.

9. The in-cylinder injection type internal combustion engine according to claim 1, wherein said reduced fuel consumption temperature increasing mode is slightly lean compression stroke injection.

10. A method of maintaining activation of an exhaust gas purifying catalyst device provided in an exhaust passage of an in-cylinder injection type internal combustion engine having fuel injection valves for injecting fuel directly into combustion chambers of the engine, comprising:

detecting cold start of the engine;

executing a multi-stage injection mode, which includes main fuel injection for main combustion and additional fuel injection in an expansion stroke after said main injection, to preheat the temperature of said exhaust gas purifying catalyst device after cold start is detected;

executing a reduced fuel consumption temperature increasing mode, which achieves stratified fuel combustion in such a manner that an air-fuel ratio of the engine becomes stoichiometric or in a vicinity thereof, to further increase temperature of said exhaust-gas purifying catalyst device; and executing said multi-stage injection mode and then said reduced fuel consumption temperature increasing mode.

11. The method according to claim 10, wherein said normal injection mode is an open control loop fuel injection.

12. The method according to claim 10, wherein said control device operates in said normal injection mode before said multi-stage injection mode following a cold-start condition.

13. The method according to claim 10, wherein said reduced fuel consumption temperature increasing mode is slightly lean compression stroke injection.

14. An in-cylinder injection type internal combustion engine having fuel injection valves for injecting fuel directly into combustion chambers of said internal combustion engine, comprising:

ignition plugs provided on an engine body in such a way as to face said combustion chambers;

an exhaust-gas purifying catalyst device, provided in an exhaust passage of the internal combustion engine, arranged to purify harmful components in an exhaust gas; and a control device having a temperature-increase control section arranged to achieve stratified combustion in such a way that an air-fuel ratio of said internal combustion engine becomes a stoichiometric air-fuel ratio or in a vicinity thereof when an increase in a temperature of said exhaust-gas purifying catalyst device is needed, wherein said control device further includes an additional-fuel injection control section for injecting fuel in an injection other than a main injection for main combustion, wherein before activation of said temperature-increase control section, said control device causes said additional-fuel injection control section to inject additional fuel in an expansion stroke after said main injection, wherein said control device further includes an injection-timing control section arranged to control injection timings of said fuel injection valves and ignition-timing control section for controlling ignition timings of said ignition plugs, and wherein at a time said temperature-increase control section is activated, said control device adjusts at least one of said injection timings set by said injection-timing control section and said ignition timings set by said ignition-timing control section in such a way as to make an interval between injection timing and ignition timing longer than in the stratified combustion in which said temperature-increase control section is not activated.

15. The in-cylinder injection type internal combustion engine according to claim 14, wherein at a time said temperature-increase control section is activated, said control device extends said interval between said injection timing and said ignition timing by at least one of advancing said injection timing and delaying said ignition time.

16. The in-cylinder injection type internal combustion engine according to claim 14, wherein said interval between said injection timing and said ignition timing is set to approximately 40 to 60 degrees by a crank angle.

* * * * *

UNITED STATES PATENT AND TRADEMARK OFFICE
CERTIFICATE OF CORRECTION

PATENT NO. : 6,637,192 B2
DATED : October 27, 2003
INVENTOR(S) : Shigeo Yamamoto et al.

It is certified that error appears in the above-identified patent and that said Letters Patent is hereby corrected as shown below:

<u>Title page, Item [54] and Column 1, lines 1-2,</u>
Title, should read -- IN-CYLINDER INJECTION TYPE INTERNAL COMBUSTION ENGINE --

Item [30], Foreign Application Priority Data, should read
-- Feb 19, 1999     (JP)………………….. 11-042144 --

Signed and Sealed this

Seventh Day of September, 2004

JON W. DUDAS
*Director of the United States Patent and Trademark Office*